(12) United States Patent
Martin et al.

(10) Patent No.: US 6,314,426 B1
(45) Date of Patent: Nov. 6, 2001

(54) INFORMATION RETRIEVAL AND DISPLAY SYSTEMS

(75) Inventors: Sean Christopher Martin, Cambridge; Paul Nicholas Cox, Over, both of (GB)

(73) Assignee: Roundpoint, Inc., San Francisco, CA (US)

( * ) Notice: Subject to any disclaimer, the term of this patent is extended or adjusted under 35 U.S.C. 154(b) by 0 days.

(21) Appl. No.: 09/068,440

(22) PCT Filed: Nov. 7, 1996

(86) PCT No.: PCT/GB96/02730
§ 371 Date: Apr. 5, 1999
§ 102(e) Date: Apr. 5, 1999

(87) PCT Pub. No.: WO97/17661
PCT Pub. Date: May 15, 1997

(30) Foreign Application Priority Data

Nov. 7, 1995 (GB) .................................. 9522791

(51) Int. Cl.⁷ .................................................. G06F 17/30
(52) U.S. Cl. ................ 707/100; 707/102; 345/161; 345/156; 345/167; 345/163; 345/145; 345/123; 345/341; 345/352; 345/353; 345/354
(58) Field of Search .................... 707/100, 102; 345/156, 161, 163, 167, 341, 352, 353, 354, 123, 145

(56) References Cited

U.S. PATENT DOCUMENTS

| 4,879,648 | 11/1989 | Cochran et al. | 345/353 |
| 5,374,942 | * 12/1994 | Gilligan et al. | 345/157 |
| 5,602,566 | * 2/1997 | Motosyuku et al. | 345/123 |
| 5,627,948 | * 5/1997 | Fukunaga | 395/111 |
| 5,646,646 | * 7/1997 | Inoune et al. | 345/123 |
| 5,726,687 | * 3/1998 | Belfiore et al. | 345/341 |
| 5,859,638 | * 1/1999 | Coleman et al. | 345/341 |
| 5,936,618 | * 8/1999 | Spiero et al. | 345/204 |
| 5,978,816 | * 11/1999 | Sakaguchi et al. | 707/501 |
| 5,994,710 | * 11/1999 | Knee et al. | 250/557 |

FOREIGN PATENT DOCUMENTS 9300067    1/1993  (NL) .

* cited by examiner

Primary Examiner—Jack Choules
Assistant Examiner—Cheryl Lewis
(74) Attorney, Agent, or Firm—Christensen O'Connor Johnson Kindness PLLC

(57) ABSTRACT

In an information retrieval and display system, an interface unit receives signals from a hand-held control unit and controls the information displayed on a display. The information available for display is arranged in a tree structure. The interface unit is arranged to scroll through the currently displayed information in a first direction at a speed related to the displacement of the control unit in a first direction, to scroll through the currently displayed information in a second direction at a speed related to the displacement of the control unit in a second direction, to display information from a lower level in the tree in response to movement of the control unit in a third direction, and to display information from a higher level in the tree in response to movement of the control unit in a fourth direction.

45 Claims, 12 Drawing Sheets

Fig.5A. HIGH LEVEL

| CATEGORY NAME A | CATEGORY NAME B | CATEGORY NAME C | CATEGORY NAME D |
|---|---|---|---|
| TITLE A1<br>TITLE A2<br>TITLE A3 | TITLE B1<br>TITLE B2<br>TITLE B3 | TITLE C1<br>TITLE C2<br>TITLE C3 | TITLE D1<br>TITLE D2<br>TITLE D3 |

Fig.5B. MID LEVEL

| CATEGORY NAME A | | | | | |
|---|---|---|---|---|---|
| TITLE A1<br>EXTRACT A1 | TITLE A2<br>EXTRACT A2 | TITLE A3<br>EXTRACT A3 | | | TITLE AN<br>EXTRACT AN |

Fig.5C. LOW LEVEL

| TITLE A3 | PAGE 1 | PAGE 2 | PAGE 3 | | PAGE N |
|---|---|---|---|---|---|

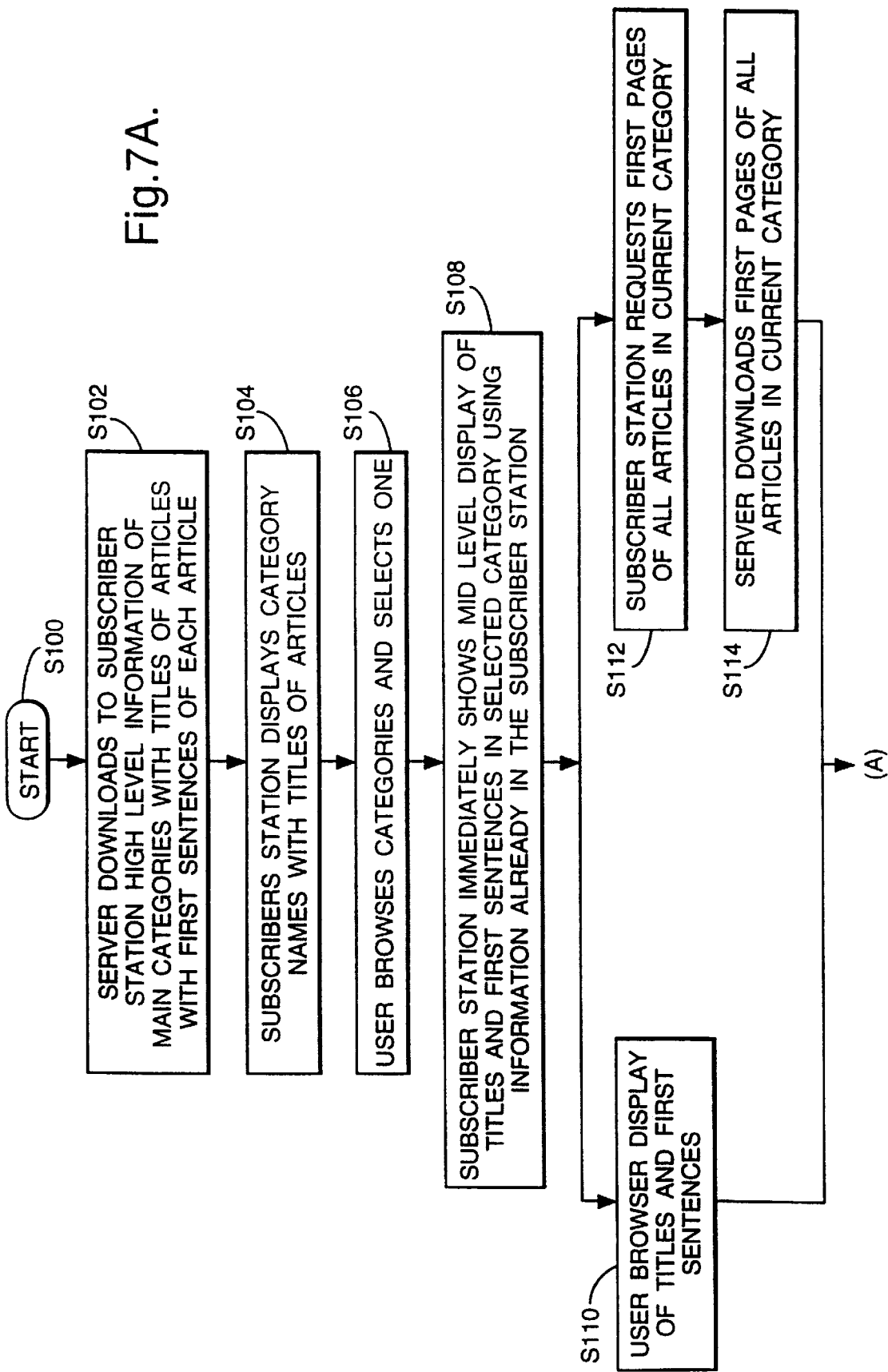

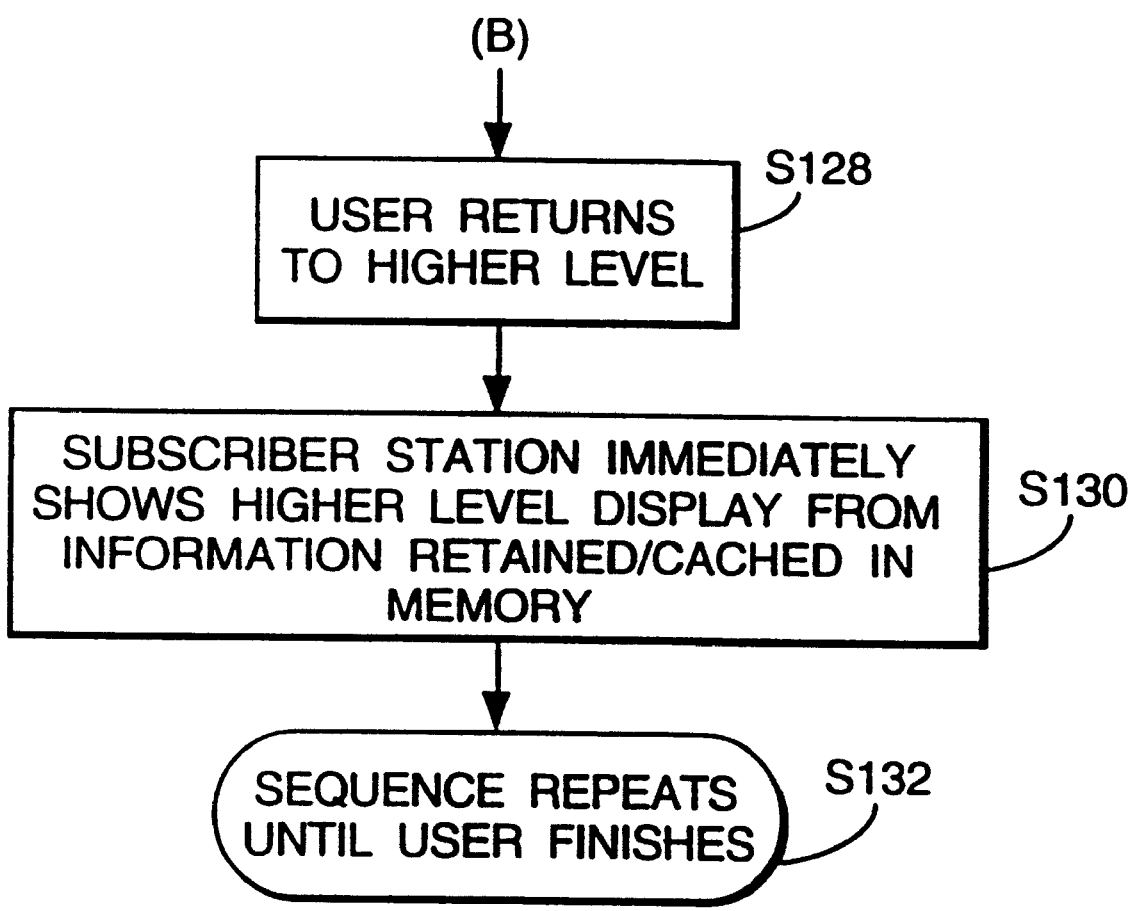

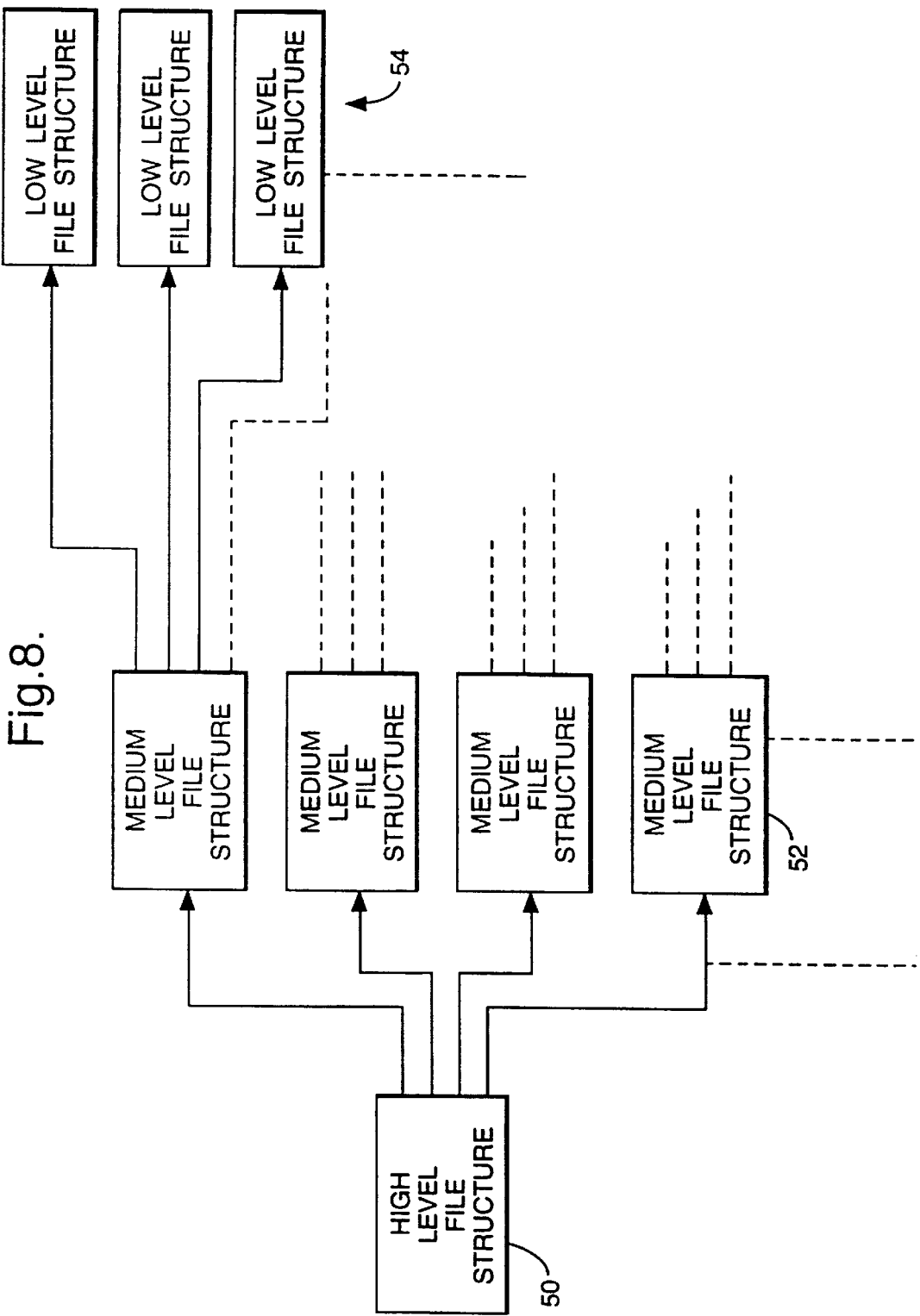

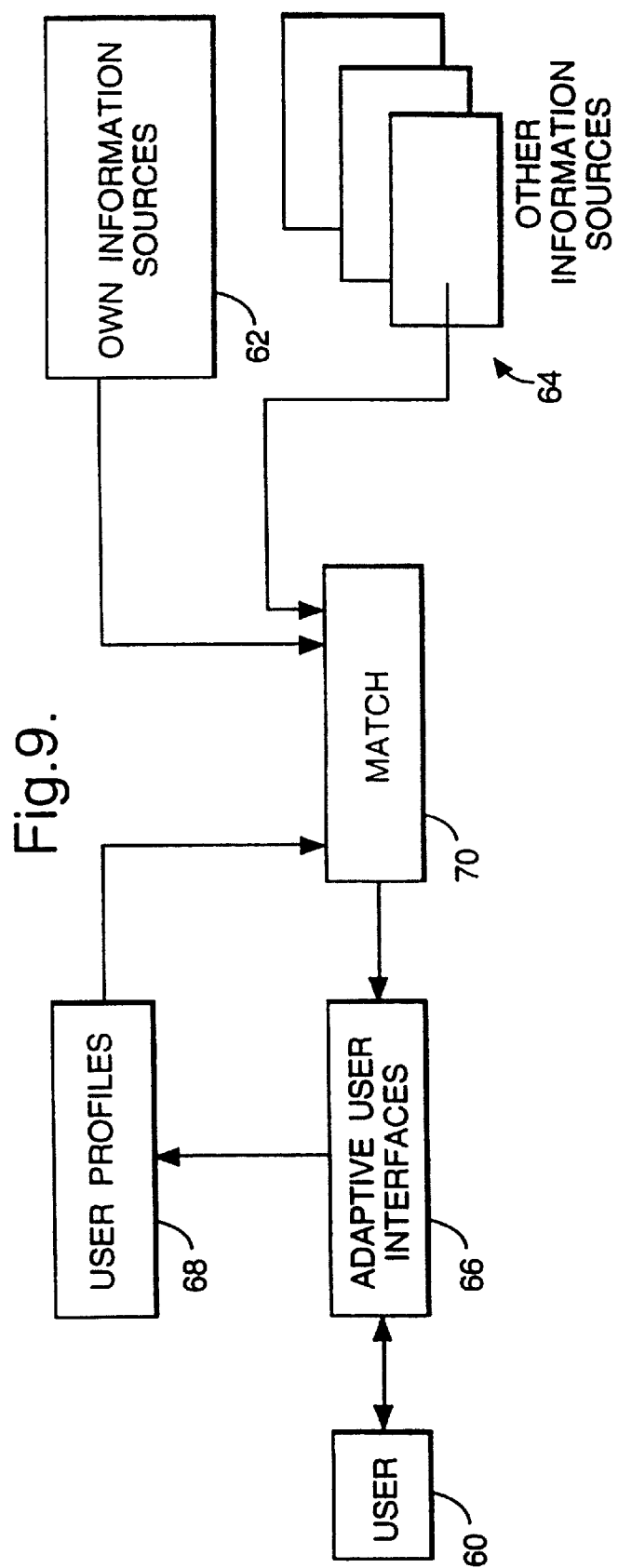

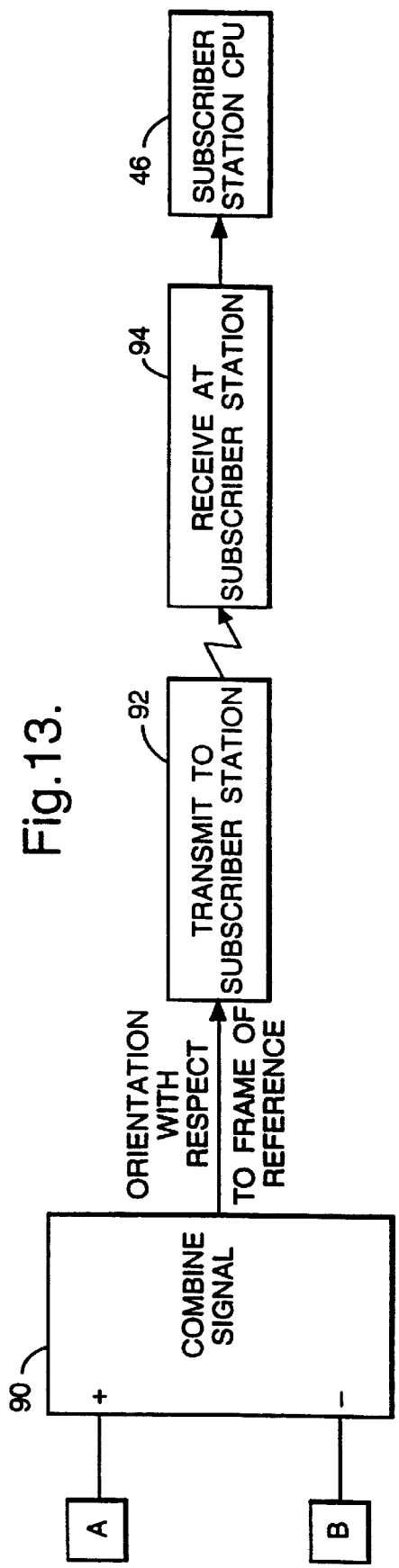

INFORMATION RETRIEVAL AND DISPLAY SYSTEMS

This application is the U.S. national stage of International Application Ser. No. PCT/GB 96/02730 filed on Nov. 7, 1996, which designated the United States, and which in turn claims foreign priority based on Great Britain Application GB 9522791.4 filed on Nov. 7, 1995, the benefit of the filing dates of which are claimed under 35 U.S.C. §§ 119 and 120.

FIELD OF THE INVENTION

This invention relates to information retrieval and display systems, and to the control thereof.

BACKGROUND OF THE INVENTION

Information retrieval and display systems are known having browsing facilities whereby, for example, lists of items, such as news articles, available from a data storage apparatus may be browsed through and a particular item on the list selected and displayed.

Conventional browsing systems are based on a "point and click" approach. That is, the user must move a cursor on the display, for example by moving a mouse, to position the cursor at a predefined point on the display, and then generate a control signal by "clicking" with the mouse to cause a predefined operation to occur. More particularly, the conventional system involves the display on a screen of a list of items which are available, and browsing through that list is achieved by moving a mouse so as to cause a cursor displayed on the screen to move to a predefined icon on the screen, and then clicking on the icon so that a different part of the list is displayed on the screen. To view a desired article, the user must again move the mouse so as to cause the cursor to move to the title of the desired article, and then click on the article so that the article itself is displayed on the screen.

This approach is both cumbersome to use and relatively slow. In particular, the technique requires the user to perform at least two actions to change the information displayed—firstly an action to move the cursor to the required point on the screen, which can typically require the user to move the cursor across the whole length of the screen, and secondly an action to "click" at the point on the screen to cause a predetermined operation to be performed. Further, the technique requires accurate hand-eye co-ordination, since it requires the user to accurately manipulate the mouse to move the cursor to the exact position required on the screen before the clicking operation can be performed. A further problem lies in the fact that the user must know where to point and click in order to perform the required command. For example, the user must know which icon to click on in order to scroll forwards in a display, and which different icon to click on to scroll backwards in the display, and must also know where to click once an article is being viewed in order to return to the main list of articles so that a further article can be selected. In addition, many repeated user actions can be required to scroll through a lengthy source of information.

In other conventional systems, the point and click environment is not provided, and instead the user is required to type in commands in order to control the displayed information. This compounds the problems above, in particular in that a plurality of operator actions are required to perform a command, and the user must know what commands to type.

SUMMARY OF THE INVENTION

The object of one aspect of the invention is to address one or more of these problems and to provide an improved technique for selecting and browsing information. For example, in one aspect, the invention may simplify and speed up the selection and browsing of information by reducing the number of actions and/or the number of muscle movements that need to be performed by the user. This may be achieved by providing a selecting device having first and second degrees of freedom, one of which, for example a forward and backward movement, causes scrolling, and the other of which, for example a left and right movement, causes switching between information displayed. The device could be a mouse, a joystick or alternatively could be four buttons, for example namely an up-button, a down-button, a right-button and a left-button. Other devices are possible within the scope of the invention.

In another aspect the invention comprises a method or apparatus for controlling outputted information such that:
  in response to a first control signal generated by a first operator action of a single type, information is scrolled through in a first direction at a speed related to the first operator action;
  in response to a second control signal generated by a second operator action of the single type, information is scrolled through in the opposite direction at a speed related to a value set by the second operator action;
  in response to a third control signal generated by a third operator action of the single type, the information displayed is changed; and
  in response to a fourth control signal generated by the fourth operator action of the single type, the information displayed is changed.

Another aspect of the invention concerns an improved display protocol involving displays in different levels of detail, particularly within a given document (for example a newspaper). For example, a high-level of detail may comprise a list of categories of information with each category name being followed by a list of titles within that category, the next lower level of detail may comprise a list of titles from a selected category with an extract of the article or other item under each title, and the next lower level of detail may comprise a complete article.

Another aspect of the invention relates to a novel controller for controlling information output from an information output device. The novel controller is a hand-held device having orientation sensing means so that changes in orientation produce control signals. The changes in orientation may be from the horizontal angle or from the vertical angle or from any other datum position. Operator actuated means are preferably provided for establishing the datum or reference position. For example, a push button may be provided which, when pressed causes the device to sense its current orientation for use as a reference. Preferably is the device is elongated so that small movements (changes in angle) may generate control signals. The device may be connected by wire or cable to the system to be controlled or alternatively may transmit control signals for example using infra-red or low power radio.

In another aspect, the invention relates to an improved protocol for the transfer of information from a data storage apparatus to memory associated with a display or other output apparatus in which, in order to provide rapid availability of information of a next lower level of detail, at least part of the information from the next lower level of detail is stored in memory associated with the display or other output device while a current level of display or other output device is being generated and, for example, being browsed through.

Another aspect of the invention relates to a novel file structure for the storage of information to facilitate selection of information for output by a display or other output device. In the novel file structure, for example, a first file may contain a list of categories of information within a particular type together with titles or names of each item of information within that category preferably also together with a summary or extract from each item within that category, arranged so that the whole file may be transferred to memory associated with a display or other output device.

In another aspect of the invention, a novel file structure for the storage of information comprises a first set of files containing the titles or names together with the first section or first page or portion of each item of information and a further set of files each one of which contains the remainder of a respective different one of said item.

A further aspect of the invention relates to a monitoring system for monitoring user access to an information supply system in order to indicate the type of information accessed by, and therefore of probable interest to, the user. Preferably the monitoring system is used in conjunction with the browsing arrangement and a user profile is built up in which values are assigned to different information types accessed and weight given to the value dependent upon factors such as frequency of access to that type of information, time spent accessing the information or browsing, frequency of access or delays between times when the information is accessed.

The user profile may be updated passively in the manner described above, or updated actively by the user selecting or highlighting a portion of the displayed information. The profile of user interests may be used subsequently to match with new items of information which are likely to be of particular interest to a specific user.

Preferably all of the above aspects of the invention are combined in a single system, but this is not essential. Benefits over existing systems can be achieved by selecting one of the above aspects or a combination of two or more of the above aspects.

The invention is described further by way of example with reference to the accompanying drawings, in which:

BRIEF DESCRIPTION OF THE DRAWINGS

FIGS. 5A–5C diagrammatically illustrates three different levels of information displayed by the subscriber station of FIG. 3 during browsing;

FIGS. 7A–7C is a flow chart illustrating information transfer steps between the server station and a subscriber station and information display steps at the subscriber station, during browsing;

FIG. 8 is a diagram illustrating part of the file structure within the server station of FIG. 2;

FIG. 9 is a functional block diagram illustrating a monitoring and control process performed, in accordance with the preferred embodiment of the invention, in the subscriber station of FIG. 3;

FIG. 13 is a block diagram for illustrating the operation of the controller of FIGS. 11 and 12.

DESCRIPTION OF THE INVENTION

Figure 1:
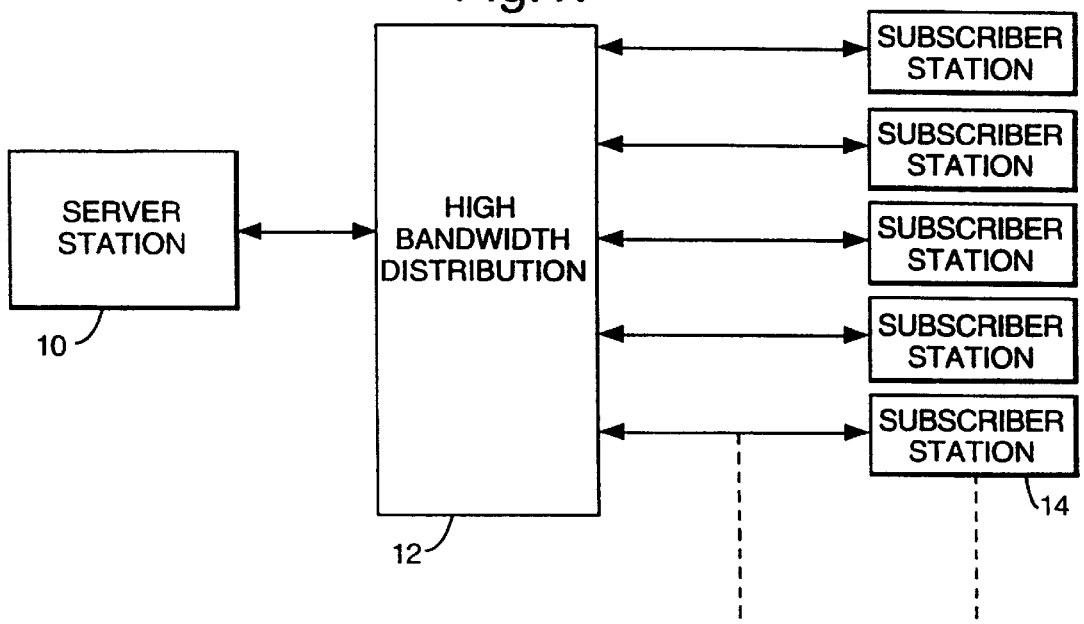
FIG. 1 is a block diagram of an information retrieval and display system in which the invention may be embodied.

The information display system of FIG. 1 comprises a server station 10 coupled to a high bandwidth distribution system 12, such as a cable TV distribution network, a satellite TV network, a local or wide area computer network, private or public telecommunications circuits, or the Internet, and a plurality of subscriber stations 14 each connected to the distribution system 12. Each subscriber station is operable for requesting information from the server station 10 by transmitting appropriate control signals thereto via the distribution system 12 and, in response to such requests, the server station 10 downloads appropriate information to the relevant subscriber station 14 through the distribution system 12. The user at the subscriber station 14 may then browse through the information which has been downloaded and, when he wishes, select further information for downloading and browsing.

Figure 2:
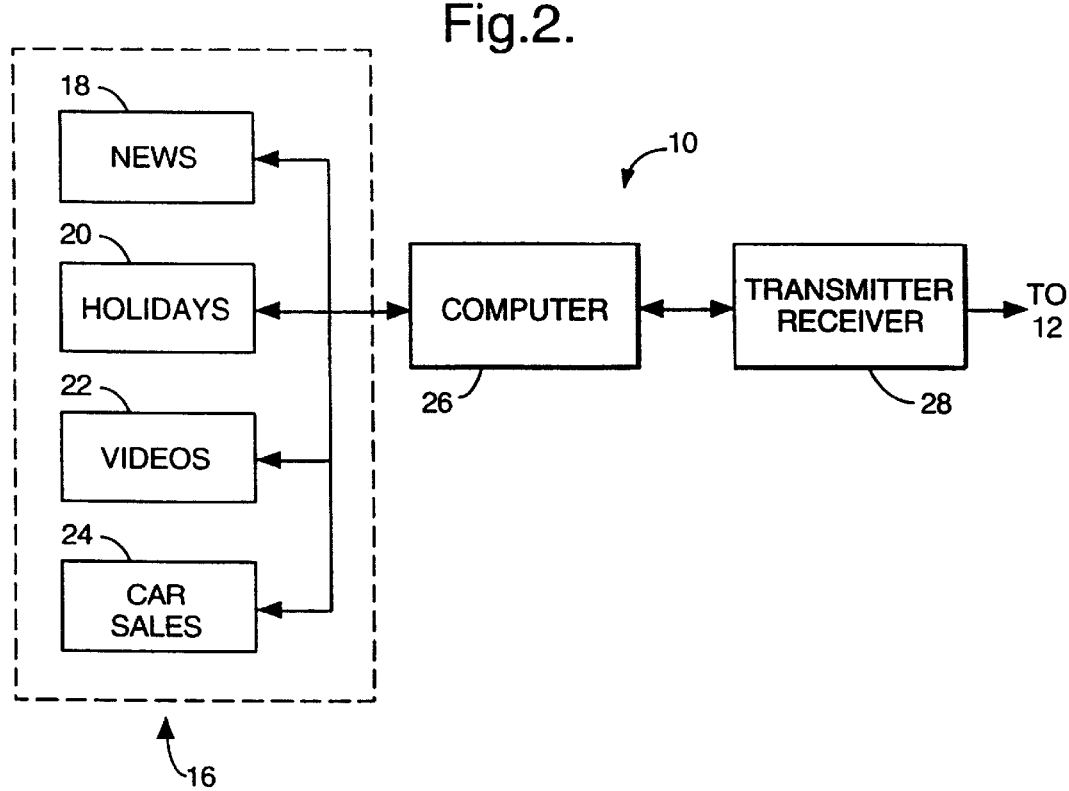
FIG. 2 is a block diagram of a server station of the system of FIG. 1.

Accordingly, as shown in FIG. 2, the server station comprises large capacity data storage apparatus 16, which may be of any conventional form, for example hard magnetic discs, optical discs, magneto-optical discs, semiconductor random access memory, CD ROM or combinations thereof. Information of a number of different types is stored in the data storage apparatus 16. In the example shown in FIG. 2, the data storage apparatus 16 is shown as divided into four blocks 18, 20, 22, 24 storing respectively four different types of information, namely in this example news, holiday information, videos and car sales information respectively. The news information may be in the form of an electronic newspaper, the holiday information may comprise details of different types of holiday, different resorts and different hotels at different resorts, the videos may comprise feature films or video extracts or recordings of television programmes, and the car sales information may comprise details of new and used cars for sale.

The server station 10 further comprises a computer 26, which may comprise one or more CPUs with associated memory storing control programs, and which is coupled to the data storage apparatus 16 for retrieving data therefrom. The computer 26 is also coupled to transmitting and receiving apparatus 28, which in turn is connected to the high band-width distribution system 12, so that the computer may receive from the distribution system 12 requests for particular information from the data storage apparatus 16 and, in response to those requests, retrieve that information, address it as appropriate and supply it to the distribution system 12.

In accordance with a preferred embodiment of the invention, the data stored in the storage apparatus 16 is arranged in a novel manner (to be described below) facilitating browsing and access to that information by a user at a subscriber station 14. Otherwise, the server station 10 may be of conventional construction and arrangement.

Figure 3:
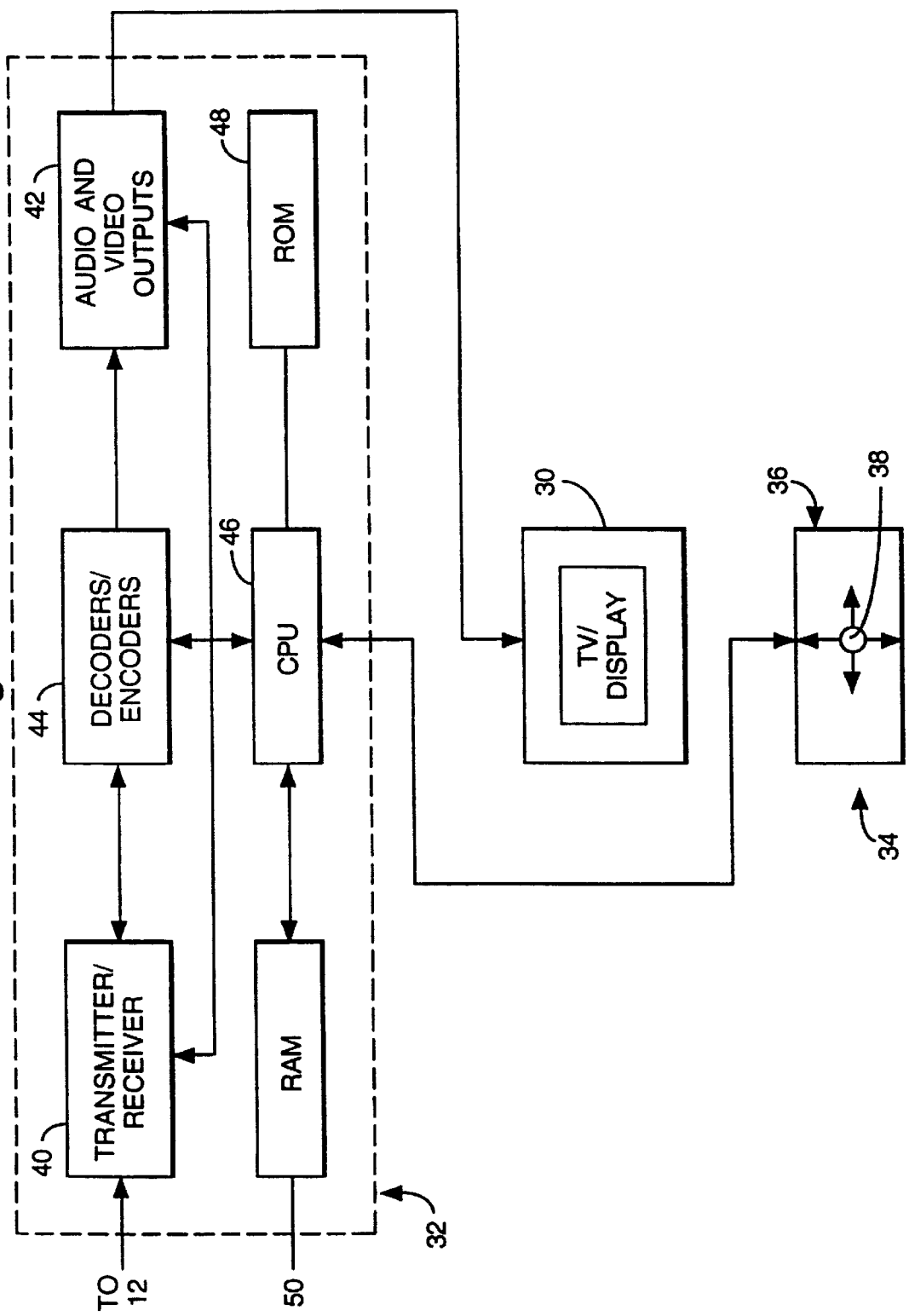
FIG. 3 is a block diagram of a subscriber station of the system of FIG. 1, in accordance with the preferred embodiment of the invention.

FIG. 3 shows the elements within a subscriber station 14. Each subscriber station 14 comprises a conventional display apparatus, such as a liquid crystal display or television receiver 30, an interface unit 32 connected between the television receiver 30 and the high bandwidth distribution system 12, and a hand-held control unit 34 connected to the interface unit 32. In this embodiment, the hand-held control unit 34 is in the form of a conventional joystick controller comprising a base 36 and a joystick 38 mounted for movement with two degrees of freedom relative to the base 36, namely movement in the forward/reverse direction and in the left/right direction as shown by the arrows in FIG. 3. Other control devices can be used as described later.

The interface unit 32 comprises transmitting and receiving apparatus 40 connected to the distribution system 12 for transmitting to the server station 10 requests for downloading of data and for receiving the requested data therefrom, audio and video output circuitry 42 for supplying audio and/or video signals, for example in PAL, NTSC or SECAM form, to the television receiver 30, and a decoding and encoding arrangement 44 for decoding signals received from the transmitter/receiver apparatus 40 and for encoding signals for supply to the transmitter/receiver apparatus 40 for requesting information from the server 10 and for encoding signals into appropriate form for supply to the audio and video output circuitry 42. In addition, a central processor unit 46 is connected to the transmit/receive apparatus 40, decoder/encoder arrangement 44 and audio and video output circuitry 42 for controlling the operation thereof in accordance with programs stored in a ROM 48. RAM 50 is provided in the interface unit 32 and connected to the CPU 46 so that the CPU 46 may store in the RAM 50 data downloaded from the server station 10 and may retrieve such data from the RAM 50 for appropriate encoding for output as video and/or audio signals to the TV receiver 30.

As shown in FIG. 3, the joystick controller 34 is connected to the CPU. The ROM 48 contains programs for causing the interface unit 32 to respond to movements of the joystick 38 in a novel manner for facilitating browsing of the information available from the server 10. Otherwise, the interface unit 32 may be of conventional construction and arrangement and thus may comprise, for example, a conventional so-called "set-top box" for connection to a television receiver but containing novel control programs in ROM 48. ROM 48 may be replaced by RAM, in which case the control programs may be transferred to the RAM via a storage device, for example a conventional computer disk, or may be transmitted as signals thereto, for example via the Internet. The control programs could be transmitted to the subscriber station 14 from the server station 10.

Figure 4:
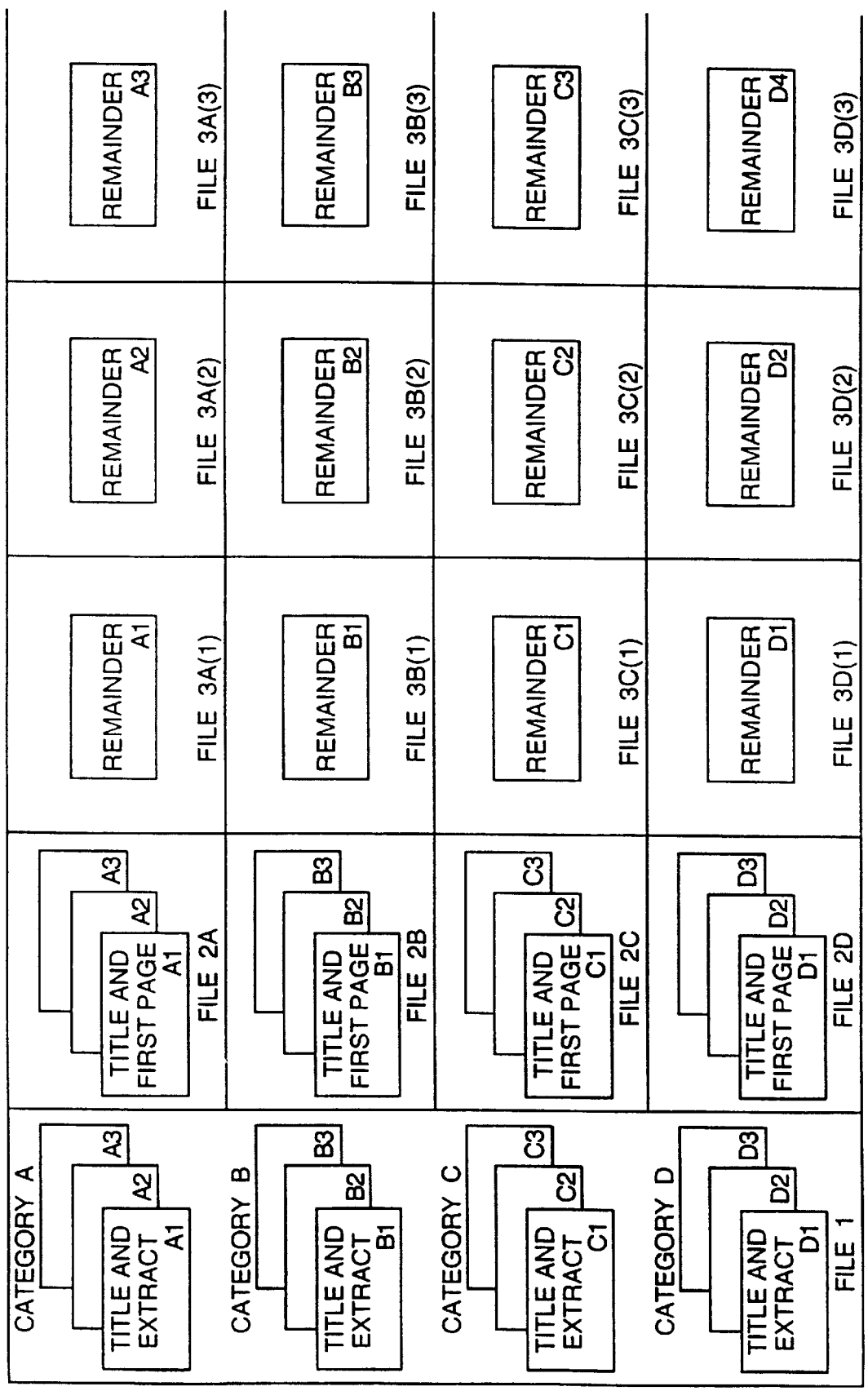
FIG. 4 is a diagram illustrating the file structure and organisation of data stored in memory of the server station of FIG. 2, in accordance with the preferred embodiment of the invention.

FIG. 4 illustrates the file structure and organisation utilised for each of the memory blocks 18, 20, 22, 24 of the data storage apparatus of FIG. 2. Only one of these four memory blocks is shown in FIG. 4 and, for the purpose of exemplification and to assist in understanding the file structure and organisation, it will be assumed that this is the memory block 18 containing news information in the form of an electronic newspaper.

In this embodiment, as described below, the information within a memory block is arranged in a tree structure. However, this does not impose a limitation on the invention. For example, the information may be linked in any way and a tree structure need not be employed. If a tree linkage is used, then the information need not be such that each level of the tree contains information which is more detailed than the information in the adjacent higher level of the tree. Instead the information within the tree may be arranged so that in some branches of the tree information at a lower level of the tree is less detailed than the information in the adjacent higher level of the tree.

As can been seen in FIG. 4, the memory block in this embodiment is organised into a set of files identified as File 1, Files 2A to 2D, Files 3A(1) to 3D(1) etc. The arrangement of the system is such that the complete contents of a file are downloaded without interruption in response to an appropriate request from a user station 14.

Conventionally, a newspaper, including an electronic newspaper, contains news in different categories such as world news, UK news, sports news and arts news. Within each category there will be a number of different news articles or news reports each of which will have a headline or title and the headline or title will be followed by the text of the article. As shown in FIG. 4, file 1 contains each of the category names and, following each category name, the title of each of the articles within that category and, following each title, an extract from the article, preferably the first sentence, the first few lines of the article or a summary. Thus, for the purpose of explanation, the articles in category A are referred to as Articles A1, A2, A3 etc., and those in Category B are called Articles B1, B2, B3 etc. The same applies to the Articles in Categories C and D. Thus, FIG. 4 shows in the File 1 block that Category A (for example world news) is followed by the headlines or titles of the Articles in that Category with extracts as described. Similarly, File 1 contains the same information for each of the other news categories.

File 2A contains the title followed by the first page of each of the articles of category A. In this context, a page refers to the first portion of the Article and may correspond to the amount of information which can be displayed on the TV screen 30. Thus, the title or headline of Article A1 is followed by the first page of Article A1 which in turn is followed by the title and first page of Article A2 etc.

Each of files 2B, 2C and 2D are similarly organised so that in files 2B, for example, the title or headline and first page of the first article in category B (e.g. UK news) is followed by the title and first page of the second article etc.

File 3A(1) contains the remainder of the first article in Category A i.e. it contains pages 2 to the end of that article. File 3A(2) contains the remainder of the second Article in Category A and file 3A(3) contains the remainder of the third Article in Category A. Similarly there is a separate file (not shown in FIG. 4) for the remainder of each of the other Articles in Category A.

As already mentioned above, file 2B contains the title and first page of each of the Articles in category B (e.g. UK news). File 3B(1) contains the remainder of the first Article in Category B, file 3B(2) contains the remainder of the second article in Category B etc. and, as with the Category A articles, there is a separate file for the remainder of each other Article in Category B.

Similarly, there is a separate file for the reminder of each Article in Category C, these being labelled files 3C(1), 3C(2) etc., and separate files for the remainder of the Articles in category D, these being labelled as files 3D(1), 3D(2) etc.

The data in each file is arranged so that the whole file can read out rapidly and without interruption to provide maximum downloading speed. Thus, preferably, the data in a given file is contained in a continuous set of address locations.

For the purpose of easy browsing, information from the server station 10 is displayed on the TV screen of a subscriber station whose user selects that information in a number of different levels of an information tree. Three levels are illustrated in FIG. 5. A high-level display consists of a list of category names with each category name being followed by a list of headlines or titles within that category. That is, the high-level display, in this embodiment, contains information of a low-level of detail (with respect to the other levels in the tree), although this need not be the case. Thus, FIG. 5a shows category name A followed by title A1, title A2 etc., and category name B followed by title B1, title B2 etc. The user scan scroll through this list in a manner to be described., This display is first obtained by selecting the information type (in this example news, holidays, videos or car sales) from a menu in a conventional manner.

The mid-level display is obtained by selecting a category from the high-level display (that is, selecting a branch of the tree) and consists of the category name followed by a list of titles (e.g. headlines) with each title being followed by an extract from the article in question, for example the first sentence, the first few lines or a summary. Thus in FIG. 5b, the mid-level is shown as comprising category name A followed in turn by title A1, extract A1, title A2, extract A2 etc. The user can scroll through this mid-level information for the purpose of selecting a particular article for full display.

Thus, the low-level display shown in FIG. 5c is achieved by selecting a given title from the mid-level display (that is, selecting a further branch of the tree), and the low-level display that results comprises the title of the article (e.g. the headline) followed by the complete article shown in FIG. 5c as pages 1 to N. As will be appreciated from inspection of FIG. 5, it is assumed that the mid-level of category A news has been chosen from the high level display and that article A3 has been chosen from the mid-level display. Having chosen the low-level display, the user can scroll through the article.

Thus, it will be appreciated, that the display system presents information in a "tree" structure. That is, at the top of the tree is the high-level display shown in FIG. 5a, and selection of a category from within this level takes the user along a "branch" to a lower level in the tree, namely the mid-level display shown in FIG. 5b. Selection of a different category from the high-level display would, of course, take the user along a different branch to a different mid-level display. Similarly, selection of a title from the mid-level display takes the user along a further branch to a lower level in the tree, namely the low-level display of FIG. 5c. In this way, information is presented on-screen in a manner consistent with how users browse other media, for example a newspaper. That is, the display allows a user to glance at categories to choose a category of interest, then to glance at headlines within that category, and perhaps the first sentence of each article under the headline, before selecting an article to read, and subsequently repeating the process. The purpose of this style of presentation is so that a user may browse the information as effectively as reading a paper newspaper, namely by allowing the user to assimilate the title and start of each of a set of articles without having to examine any article in detail. As noted above, the detail of information in the lower levels of the tree need not be greater than that in the higher levels, but can instead be lower.

For ease of browsing with the minimum of operator actions, ROM 48 contains programs which cause the CPU 46 to scroll upwards and downwards through the display of the current level in response to forwards and backwards movements of the joystick 38, to switch to the next lower level of the tree for the selected information in response to a rightward movement of the joystick movement 38 and to move back to the next higher level in the tree in response to leftward movement of the joystick 38. Thus, the joystick 38 has two degrees of freedom, movement in one of which causes scrolling and movement in the other of which causes change of display level. Therefore, the user only has to perform a single action (namely displacement of the joystick) in order to cause the interface unit 32 to perform a command (scroll up, scroll down or display a different level of information). The second user action required in conventional point and click systems (namely the "clicking" operation) is not required.

Figure 6:
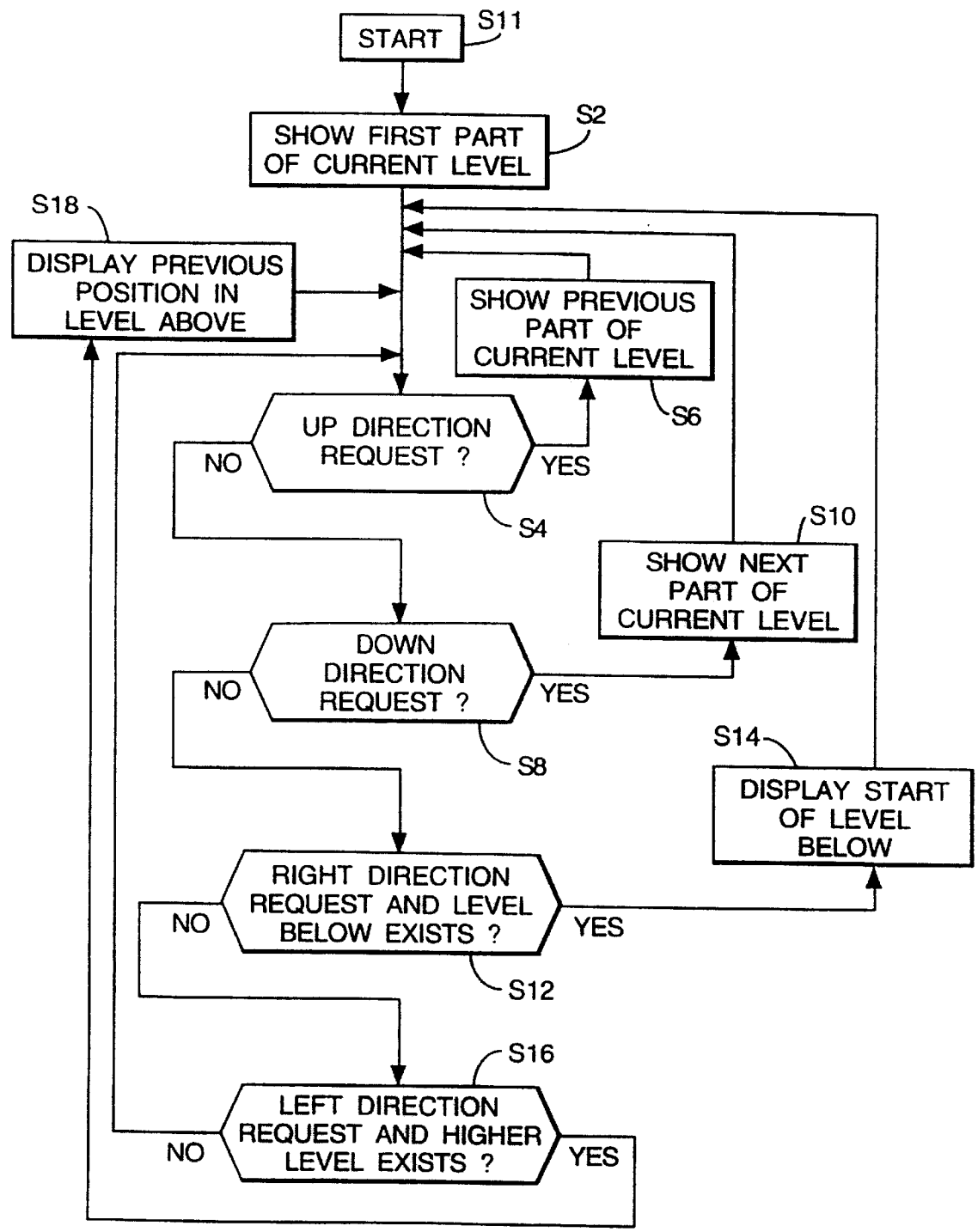
FIG. 6 is a flow chart illustrating control processes performed in the subscriber station of FIG. 3 during browsing.

FIG. 6 is a simplified flowchart of the display control program stored in ROM 48. The process starts at step S1, and at step S2 the TV 30 shows the first part of the current level (for example the mid-level display shown in FIG. 5b).

At step S4, it is determined whether the user has moved the joystick in an upward direction. If it is determined at this step that the user has moved the joystick up, then at step S6 the previous part of the current level is displayed on TV 30. on the other hand, if it is determined that the user has not moved the joystick up, then at step S8 it is determined whether the user has moved the joystick down. If it is determined at this step that the user has moved the joystick down, then at step S10 the next part of the current level is displayed on the TV 30. On the other hand, if it is determined at step S8 that the user has not moved the joystick down, then at step S12 it is determined whether the user has moved the joystick to the right and whether a level below the current level exists (or whether the tree defines a lower level). If it is determined that the answer to both of these questions is yes, then at step S14 the start of the level below is displayed. On the other hand, if it is determined that either of these questions is answered in the negative, then at step S16 it is determined whether the user has moved the joystick to the left and whether a higher level than the current level exists (or whether the user is already displaying the top most level of information in the tree). If it is determined that the answer to both these questions is yes, then at step S18 the user's previous position in the higher level is displayed.

This flowchart describes a control loop which is continuously executed. In consequence, when a user moves the joystick 38 and holds it in an up position, the display will continuously scroll up until the user returns the joystick 38 to the reference or datum position. Similarly, holding-the joystick 38 down causes continuous downward scrolling. This control of scrolling behaviour requires fewer user actions than in conventional point and click styles of user interface. A change in the level of the display, for example by a left or right motion of the joystick 38, employs a different approach; the change of display is initiated by the onset of the movement, and the joystick is returned to the datum position before a subsequent change in level of display is initiated.

In a preferred embodiment, the speed at which displayed information is scrolled through (that is steps S4 and S6 and steps S8 and S10) is varied depending upon the displacement of the joystick from its central, null (zero-displacement) position. This may be implemented so that the speed is directly proportional to the displacement of the joystick. Thus, taking downward scrolling as an example, movement of the joystick 38 by a small displacement in a down direction would cause the information on the screen to be scrolled through at a slow speed, with the speed of scrolling increasing in direct proportion to further displacement of the joystick. In an alternative arrangement, the speed of scrolling may be implemented in a non-linear manner so that the scrolling speed is not directionally proportional to the displacement of the joystick. In this arrangement, it is preferred that high speeds of scrolling are only provided for a relatively large displacement of the joystick, while relatively small displacements control the scrolling through a wide range of slow speeds. In all arrangements, it is preferred that the speed of scrolling is monotonically related to the displacement of the joystick from its central, null position, such that an increased displacement causes an increase in the speed.

Figure 7B:
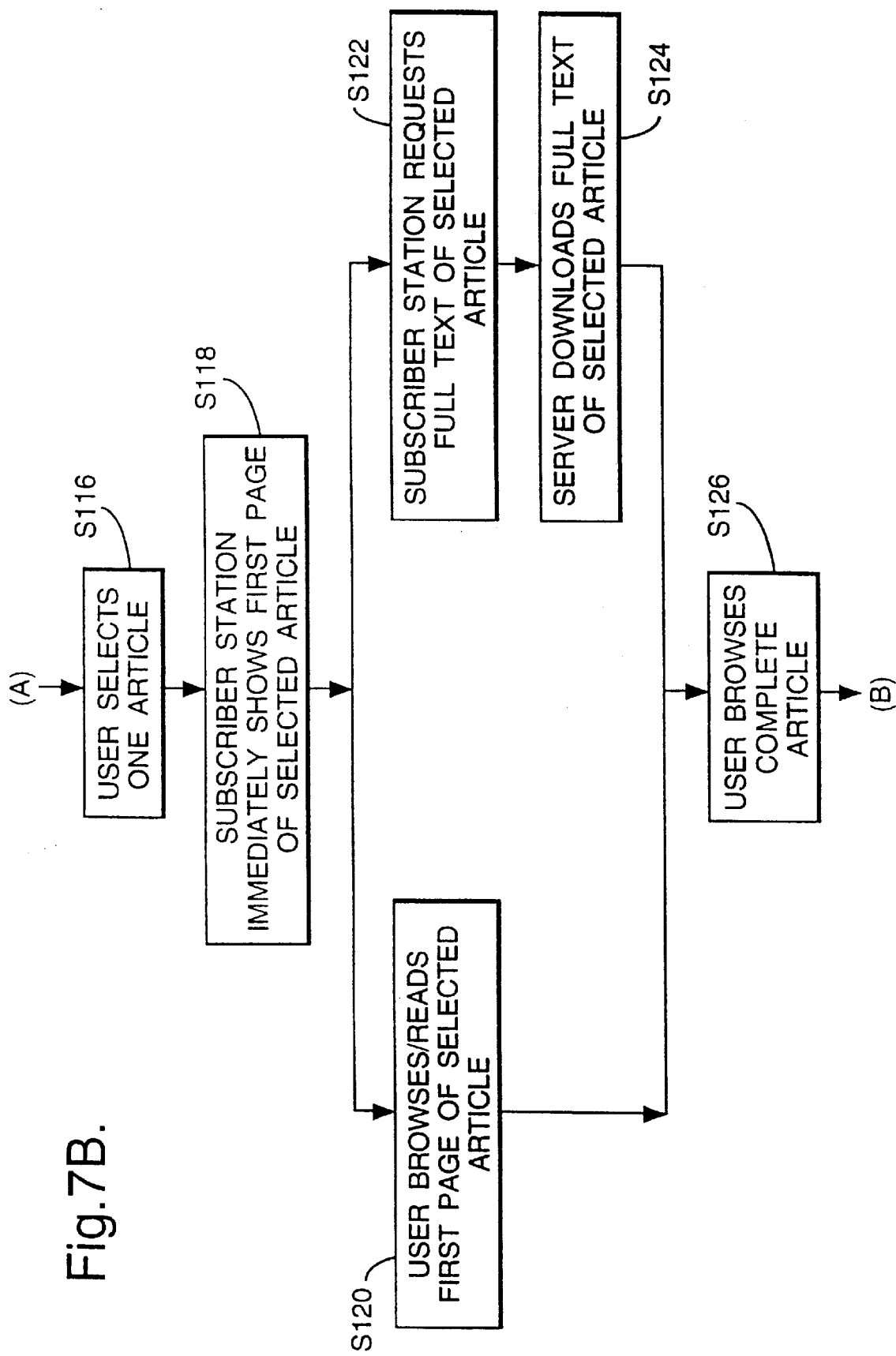

In order to minimise time delays in bringing up the next lower level of display in response to rightward movement of the joystick 38, information is stored in, and downloaded from, the server 10 into the RAM 50 in a novel arrangement. FIG. 7 is a simplified flowchart of the program stored in ROM 48 for controlling the downloading of information in a given example from the server 10 into RAM 50. The process starts at step S100, and at step S102 the server 10 downloads to the subscriber station 14 high-level information comprising the names of the main categories together with the title and the first sentence of each article within each of these categories (that is, the information contained in file 1 of FIG. 4). At step S104, the subscriber station displays the category names together with the titles of each article with in each category (that is, the high-level display shown in FIG. 5*a*). At step S106, the user browses through the categories, for example by moving the joystick 38 in an upward or downward direction so as to scroll up or down the display, causing different categories to become highlighted on the display, and selects a chosen category by moving the joystick 38 to the right when the desired category is highlighted. in response, at step S108 the subscriber station displays the mid-level display shown in FIG. 5*b*, namely the titles and first sentences of articles in the selected category. This information is already in the subscriber station since all of the information required for the high-level and mid-level displays of FIGS. 5*a* and 5*b* is stored in the same file (file 1 in FIG. 4) which has been downloaded at step S102. Accordingly, the information can be displayed substantially immediately at step S108 in response to the user making his selection at step S106.

At step S110, the use r browses the display of titles and first sentences of the mid-level display and may scroll through the information using upward and downward movements of the joystick 38. At the same time that the user is doing this, at step S112 the subscriber station 14 requests from the server 10 the first pages of all articles in the currently selected category, and at step S114 the server 10 downloads this information to the subscriber station 14. Step S112 is triggered by the user selecting a displayed category at step S106.

At step S116, the user selects an article by moving the joystick 38 to the right when the article is highlighted. In response, at step S118, the subscriber station immediately shows the first page of the selected article using the information which was previously downloaded at step S114.

At step S120, the user browses or reads the first page of the selected article. At. the same time that the user is doing this, at step S122 the subscriber station requests the full text of the selected article from the server 10, and at step S124 the server 10 downloads the requested information to the subscriber station 14. Step S122 is triggered by the user selecting a displayed article at step S116.

At step S126 the user browses the full text of the complete article, employing as necessary forward and backward movements of the joystick 38 to scroll up and down through article. At step S128 the user returns to the higher level, that is the mid-level shown in FIG. 5*b* by moving the joystick 38 to the left. In response, at step S130 the subscriber station 14 immediately shows the mid-level display from information retained or cached in memory. At step 132 further operations are performed until the user finishes.

Thus, it will be appreciated from the aforegoing description that, initially, the server 10 downloads information to the subscriber station 14 for the first two levels of display (that is the high-level and the mid-level in FIG. 5*a* and 5*b* respectively). Further, as a user reads newly displayed information, the subscriber station 14 requests the server 10 to download the next level of information. Accordingly, when the user selects the next level, the information is already available for display immediately, thereby avoiding response delays.

Thus, it will be appreciated from the foregoing description and from consideration of the flowcharts of FIGS. 6 and 7 that, when a subscriber station is set into a condition for retrieving and displaying information from the server station 10, a menu of the types of information available is generated in a conventional manner and displayed on the screen of the TV 30. Scrolling through this menu is achieved by movement of the joystick 38 backwards and forwards. Selection of a particular information type is achieved by movement of the joystick 38 to the right. The item to be selected is preferably identified, in a conventional manner, by a highlighted section on the screen, through which highlighted section the information scrolls or which can be scrolled over the information. Upon selection of a particular information type, e.g. news from the memory block 18, file 1 from that memory block is downloaded in its entirety into RAM 50 in response to an appropriate signal sent from the interface 32 to the server station 10 via the distribution system 12. Thus, at this point RAM 50 contains not only the information for the high-level display of FIG. 5*a*, namely news categories and titles of articles in each category, but also the information for the mid-level display of FIG. 5*b*, namely in this example the titles of articles and extracts from each article in each of the different categories. Thus, substantially instantaneous switching from the high-level display to the mid-level display can be achieved.

Following the downloading of file 1 from the memory block relating to the type of information selected from the menu, CPU 46 under control of programmes in ROM 48 assembles the information for display in the high-level display, namely each category name followed by a list of titles within that category and causes scrolling through that display to take place in response to backwards and forwards movement of the joystick 38. Upon selection of a particular category (e.g. world news), this selection being achieved by a rightward movement of the joystick 38, CPU 46 under control of the programs in ROM 48 assembles and outputs from file 1 the data already stored in RAM 50 necessary for the mid-level display, namely the category name followed by a list of titles with each title followed by the extract from the corresponding article. Further, in response to this selection of the mid-level display, CPU 46 instructs the transmission to the server station of a request for file 2 (FIG. 4) of the selected category, in this example file 2A. Thus, while the user is browsing the mid-level display of FIG. 5*b*, file 2 of the selected category is downloaded containing the title of each article and the first page of each article so that, if a particular article is selected from the mid-level display, the first page of that article is immediately available for display on the TV 30.

When the user identifies from the titles and extracts of the mid-level display an article which he wishes to read in full, he selects the title by a rightward movement of the joystick 38 which substantially instantaneously results in the title and first page of that article being displayed and an instruction being sent by CPU 46 under control of programmes in ROM 48 for the downloading from the server station 10 of the remainder of that article, so that when the browser has finished reading page 1 of the article, the remaining pages will have been stored in RAM 50 ready for scrolling through by forward and backward movement of the joystick 38.

When the user is in a given level and wishes to move back to the next higher level, he moves the joystick 38 to the left.

As will be appreciated from the foregoing description, scrolling and level changing is simple to perform with only one user action and with the minimum of muscle movement. Further, the operation is easy for a user to understand since, contrary to conventional systems, the system is caused to perform an opposite command by an opposite physical movement of the joystick 38. For example, to display a lower level of information, the joystick 38 is moved to the right, whilst to perform the opposite operation, that is to display a higher level of information, the joystick is moved to the left. Similarly, scrolling in opposite directions is performed by moving the joystick up or down. The user is not required to accurately position a cursor, and accordingly the embodiment requires only simple hand-eye coordination. Yet further, rapid changing of the level of display is achieved as a result of the file structure in the server station 10 and the downloading procedures whereby information for the next level is available or partially available in RAM 50 while the user is viewing a current level.

Up to this point, description of the file structure of FIG. 4 and the displays of FIG. 5 has, for the purposes of exemplification, been with reference to news information in the form of text within an electronic newspaper. Information of the other types is organised in file structures in a similar way.

Thus, in the case of car sales information, the category names stored in File 1 of the corresponding memory block 24 in data storage apparatus 16 may indicate the different classes of car, such as small saloon, executive saloon, luxury car or sports car. The titles or names would be the make and model of each car in each category and the extract information could be a short summary of the car and/or a still picture or short extract from a video about the car.

File 2 for each category would contain the make and model name of each car in that category with each make and model name followed, as shown in FIG. 4, by the first page or first part of the information about that car and the remaining files for each category would, as indicated in FIG. 4, contain the remainder of the full details about each car organised in the manner shown in FIG. 4.

With the information about car sales organised in this way, the high-level display of FIG. 5 would list the make and model of car under each category, the mid-level display would indicate the selected category followed by a list of the makes and models within that category, with each make and model identification being followed by the summary (extract) of the information about that car, and the low-level display would begin with the make and model identification and then be followed by the complete information about the car which may include text and/or audio and/or video information.

In the case of memory block 22 of FIG. 2, containing videos, File 1 may list the different categories of video available, for example drama, comedy, action films etc. Under each category both the titles of the videos available in that category would be stored and, in the manner shown in FIG. 4, each title would have stored next to it an extract indicative of the contents of the video in question. Such extract may be in the form of a short textural description and/or a still picture or pictures and/or a short moving extract such as a conventional trailer or part of a trailer to a feature film.

File 2 for each category would contain the name and first portion of each video in that category and the remaining files for each category would contain respectively the remainder of the videos.

As so far described with reference to the drawings, information is displayable in three different levels in a hierarchical manner following the initial menu. In some cases, for example in the case of holiday information, a number of extra levels may be desirable, and the levels may not be in a hierarchy with respect to the detail of information. In the preferred embodiment of the invention, this is achieved by providing within the memory block 18, 20, 22, 24 in storage apparatus 16 a set of interconnected file structures as diagrammatically illustrated in FIG. 8. For the purpose of exemplification, the interconnected file structures of FIG. 8 will be described as containing holiday information but these structures are applicable to any information stored in the system whether of the types so far mentioned or of other types.

In FIG. 8, high level file structure 50 contains high level holiday information organised in the manner shown in FIG. 4. Thus, in file structure 50, the category names in File 1 of FIG. 4 may indicate different kinds of holiday, such as summer holiday, winter holiday, winter sunshine holiday or cultural holiday. The titles in File 1 may be the names of countries in which holidays of the relevant category are available and the extracts may be a short indication of the nature of the country in question which may be textural or visual or a combination of both. Files 2A to 2D may thus contain the name of each country offering the category of holiday in question together with the first page or portion of information about that country with the remainder being stored in files 3A(1), 3A(2) . . . 3D(3). Of course, the full information need not be textural but could be audio-visual or a combination of both.

When browsing through the high-level holiday information contained in file structure 50, the high-level display of FIG. 5a would contain holiday category names followed by the countries offering such category, the mid-level display of FIG. 5b would contain the category name followed by the country names, with each country name being followed by a short description of that country, and the low-level display of FIG. 5c would give the country name followed by full details of the country.

To enable the user browsing through the information from the high-level structure 50 to obtain further details of holidays of the chosen category available in a country which interests him, the file structure 50 contains pointers, to a set of medium level file structures 52 as shown in FIG. 8. These pointers are preferably contained in Files 2A to 2D and/or Files 3A(1), 3A(2) etc., and 3B(1), 3B(2) etc. The arrangement is preferably such that the pointer is displayed on screen during scrolling and switching to a selected medium level file structure 52 is achieved by moving the joystick 38 to the right.

Each medium level file structure 52 is also preferably organised in the manner shown in FIG. 4. In this case, each file structure 52 relates to a respective different country and contains information about resorts in that country. The resorts may be divided into categories such as quiet resorts, village resorts, busy resorts etc., in which case File 1 would contain the names of the categories followed by the names of the resorts with a summary of information about each resort. The remaining files in the structure would contain full information about each resort organised as shown in FIG. 4. If it is desired not to divide the resorts into categories, the category names could be omitted and File 1 simply contain a list of resorts with a summary of information about each of them.

To enable information about accommodation in each resort to be obtained, each of the medium level file structures 52 contains pointers to a respective set of low level file structures 54 each of which, again, is preferably organised in the manner shown in FIG. 4. In a given low level file structure 54, the hotels which are available may be divided into categories such as five star, four star etc., and File 1 would contain the categories followed by a list of the names of the hotels in each category, with each hotel name being followed by an extract from the information about the hotel with the full information being contained in the remaining files of the structure as shown in FIG. 4.

Thus, it will be appreciated that in this arrangement, although the information is accessed via a tree structure, it is not arranged in a strict hierarchy with regard to the level of detail of the information. For example, selection of a given medium-level file structure 52 from a low-level file within file 50 may result in displays of a lower level of detail of information since each medium-level file structure 52 comprises three levels of information as described above.

Preferably, the three levels of display illustrated in FIG. 5 are used when displaying information from any of the files contained in the plural file structures in the arrangement of FIG. 8.

Thus, it will be appreciated from the foregoing description that any of the memory blocks such as blocks 18, 20, 22 and 24 shown in FIG. 2 may comprise a single file structure or a plurality of file structures with pointers from one to the other, each file structure being preferably organised as shown in FIG. 4. The downloading of information and the control of scrolling and selection of the level of information is preferably carried out in the manner already described, thus providing ease of browsing with substantially instantaneous availability of the next level of information. In cases where there are additional file structures as shown in FIG. 8, and thus additional levels of information to be displayed, higher levels of information may be discarded from RAM 50 when browsing within a lower level if the capacity of the RAM 50 is not sufficient to maintain all of the higher levels of information at the same time as the lower levels. Such higher levels can be reinstated by downloading them afresh when moving from lower to higher levels preferably in a manner such that when a user is in any given level both the next higher level and the next lower level are available in RAM 50 at the same time as the current level, enabling substantially instantaneous switching from one level to another, whether higher or lower.

From the foregoing description, it will be understood that users of the system may have access to large volumes of different types of information. Individual users will generally be interested only in certain of the types of information available and will regularly access those. Within the types of information accessed, individuals are also likely to be more interested in certain categories of information than others. For example one individual may be most interested in UK news, another in sports news, another in cultural holidays and yet another user may be looking for a particular type of car.

FIG. 9 shows a functional block diagram of a software-implemented system for monitoring user activity and producing a profile representative of his interests. Thus, with reference to FIG. 9, the user is represented by reference number 60, a first set of information sources indicated as his "own" information sources is indicated by reference numbers 62 and other information sources are represented by reference number 64. These information sources may be organised in file structures as previously described, with the information source 62 being perhaps local sources owned by the user and the sources 64 being perhaps remote sources to which the user has access. As the user browses through the information, the adaptive interface block 66 builds up and stores in block 68 a user profile in which a value is assigned to each different information type and/or category which the user browses through, with the value being incremented dependent upon a number of factors for example the number of times the information type or category is accessed, the time that the user spends browsing that information type or category, the time delay between occasions when he accesses that information etc. When new information becomes available, whether in the user's own information sources 62 or in other information sources 64, the identity of the new information is compared with the user profile 68 and when a matching condition is detected as represented by block 70, the user may be automatically alerted to the availability of the new information so that he may access it, or the information may be stored for the user, for example so as to build up a store of information on a particular topic. These processes are preferably software implemented and they may take place at the user station or at the server station or at some other monitoring station. Although conveniently the system of FIG. 9 is used in combination with the system described with reference to FIGS. 1 to 8, particularly since good quality user profiles may be obtainable when browsing is easy, the system of FIG. 9 can be used independently.

Various modifications are possible to the embodiment described so far.

In the system described so far, a joystick controller 36 has been described for generating the user signals to control scrolling and the display of different information. However, other devices may be used instead. For example, a mouse, a tracker ball, an orientation sensitive "wand", a pressure-sensitive device, or a four-button key pad may be used.

When using a mouse, the principle of operation is the same as that of the joystick. Thus, movement of the mouse in a first (upwards) direction causes the displayed information to scroll so as to display a previous part of the currently displayed document, while movement in the opposite (downwards) direction causes the display to display subsequent information in the document. Preferably, the speed of scrolling is monotonically related to the displacement of the mouse, as described above with respect to the joystick implementation. Movement of the mouse to the right causes a lower level of information in the tree to be displayed, and movement of the mouse to the left causes a higher level of information in the tree to be displayed. In practice, it has been found that a position display, such as the graphic shown in FIG. 10 is useful when using the mouse as the user control device.

Figure 10:
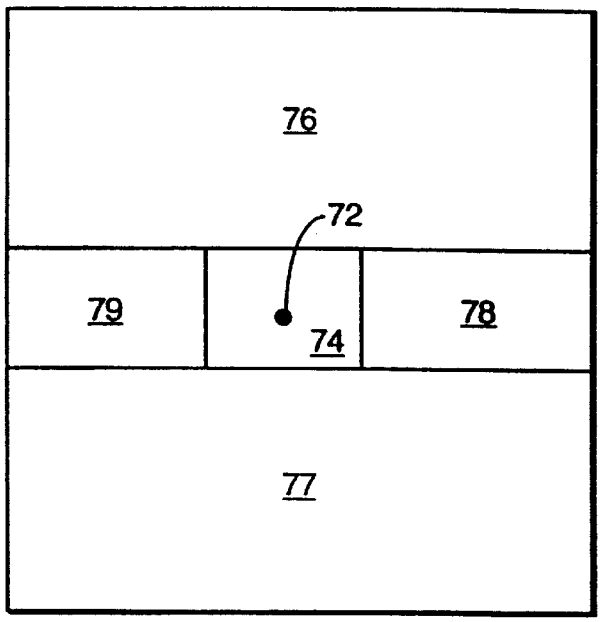
FIG. 10 is a position display graphic for use when a mouse is used as a user control device.

The display shown in FIG. 10 is displayed on TV 30 in addition to the information currently being browsed by the user. A small spot 72 acts as a cursor to show the current position of the mouse, and accordingly the position of the spot 72 moves in response to any movement of the mouse. If the mouse is moved such that spot 72 remains within area 74, then no change of the displayed information occurs. In practice, area 74 corresponds to movement of the mouse within a square of approximately 1 cm×1 cm (although, of course, other areas are possible). This has been found useful in preventing unwanted changes of the displayed information as a result of accidental movements of the mouse. Movement of the mouse which causes spot 72 to move into area 76 causes an upward scrolling of the displayed information, while movement of the mouse which causes spot 72 to move into area 77 causes a downward scrolling. Preferably, the speed of scrolling is monotonically related to the vertical displacement of spot 72 into area 76 or area 77. Movement of the mouse which causes spot 72 to move into area 78 causes information from a lower level in the tree to be displayed, and movement of the mouse which causes spot 72 to move into area 79 causes information from a higher level in the tree to be displayed.

An arrangement employing a mouse is preferable for browsing information received from the Internet, since at present the software provided on most client browsers (JAVA/AWT) is currently designed for use with a mouse.

When a tracker ball is used, this, too, operates according to the same principles as the joystick described above. However, it is preferred that changes in the level of information displayed be effected by flicking, (that is, causing a fast movement of) the tracker ball to the right (to display a lower level of information) and by flicking the tracker ball to the left (to display a higher level of information), and that no change to the level of the displayed information occurs in response to slow rightward or leftward movements of the tracker ball. This is because, in practice, it has been found that, when moving the tracker ball upwards or downwards to scroll through the displayed information, unwanted slow displacements of the tracker ball to the left or right also occur. Accordingly, unwanted changes in the displayed level of information are avoided by requiring the flick (relatively fast movement) to the left or to the right. In addition, it is preferred that when the level of information is changed by a flick to the right or the left of the tracker ball, then, firstly the origin of the co-ordinate system is re-set for future displacement reference (so that the user does not have to move the ball to its original position in order to generate a further left or right control signal) and secondly, if a cursor is displayed on the screen, this is re-centred in the display (so that the user does not have to move the tracker ball in order to bring the cursor back into view on the display).

Instead of the joystick device 36, in which the user displaces the joystick 38 in order to generate a signal, a pressure sensitive device may be used. Such a device comprises a handle, similar to joystick 38, which does not move but which is sensitive to pressure applied in orthogonal directions by the user, e.g. in the up, down, right and left directions. The operation of the pressure sensitive device is the same as the joystick controller 36, except that the control signals are generated on the basis of the direction of the applied pressure rather than the direction of displacement of the joystick 38. Control of the scrolling speed may be based on the magnitude of the pressure applied in the up or down directions.

Figure 11:
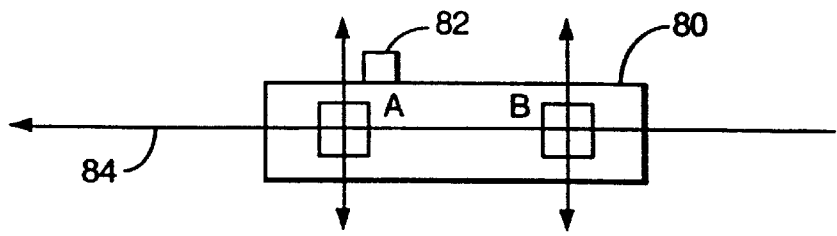
FIG. 11 is a diagrammatic side view of a hand-held controller according to a preferred embodiment of the invention.
Figure 12:
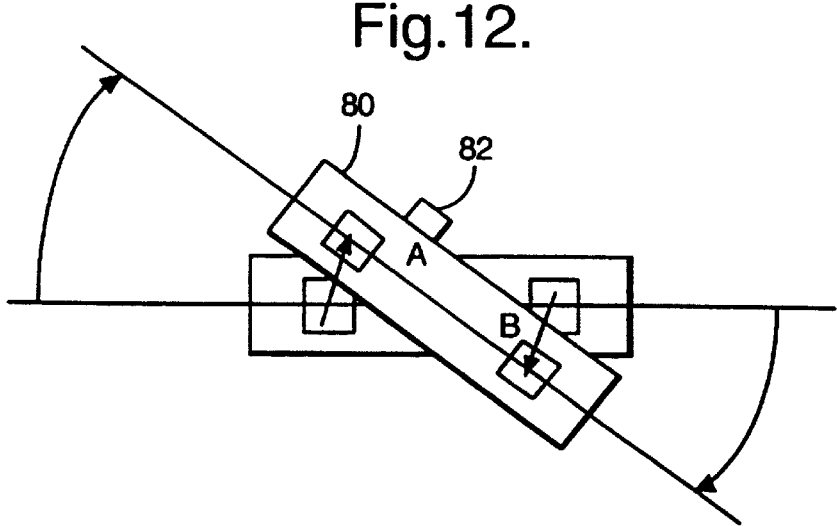
FIG. 12 shows the controller of FIG. 11 in an alternative position.

FIGS. 11 to 13 show a novel hand-held wand for controlling the information retrieval and display operation. As shown diagrammatically in FIG. 11, the wand comprises an elongate body 80 having a control button 82 mounted on its top in a position so as to be readily depressible by, for example, the thumb of the user. Four accelerometers are provided in the body 80 although only two, labelled A and B, are shown in FIG. 11. The accelerometers A and B are positioned respectively near the front and rear ends of the body 80 and are arranged for detecting acceleration in a first plane which, in this example, is the vertical plane i.e. the vertical plane when the device is held in the correct orientation with the button 82 on top. The accelerometer A senses upward motion, and the accelerometer B senses downward motion. As will be described later, the change in orientation is proportional to the change in value calculated by accelerometer A less the change in value calculated by accelerometer B. The other pair of accelerometers (not shown) are also positioned near the front and rear of the body 80 and are arranged for sensing rotation in a second plane orthogonal to the first plane, in this example the second plane being the horizontal plane. The accelerometers may be of conventional construction.

Circuitry within the body 80 responds to actuation of the button 82 to establish a frame of reference or start orientation for the device, such start orientation being represented in FIG. 11 by the horizontal arrow 84. Any rotational movement of the body 80 from the start orientation is then detected by the accelerometers which produce signals having a magnitude dependent upon the acceleration. The arrangement is such that, in the preferred embodiment, scrolling is controlled by effecting rotation in one plane (for example the vertical plane) and changing the level of display is achieved by rotation in the other plane (in this example the horizontal plane). Thus, movement to the right may select the next lower level of detail and movement to the left the next higher level of detail. Rotation in the vertical plane so that the front moves upwardly and/or the back moves downwardly, as shown for example in FIG. 12, may cause scrolling upwards, and rotation in the opposite direction in the vertical plane may cause scrolling downwards.

Although in the description of FIGS. 11 and 12 so far, it has been assumed that the start orientation of the wand or the frame of reference is in a horizontal plane, this frame of reference can be in any plane, for example the start orientation may be vertical so that the device is moved for effecting control in the manner of a joystick.

For generating and transmitting signals from the device 80 to the interface unit 32, the accelerometers A and B have their outputs connected, as shown in FIG. 13, to a signal combining circuit 90 which obtains a difference between the two signals and this difference is applied to a transmitter 92 for transmission, for example using infra-red or lower power radio, to a corresponding receiver 94 which supplies it output to the CPU 46 of the interface unit. The other pair of accelerometers is similarly arranged although this is not shown in FIG. 13.

The device of FIGS. 11 to 13 may be particularly convenient to use since small movements, as with a conductor's baton (when moved by finger movements as distinct from arm movements), may achieve the desired control of the browsing operation.

The degree to which the wand controller is moved may be used to control the speed of scrolling.

The wand may be modified compared to that shown in FIGS. 11 to 13. For example, wand orientation may be detected by means other than accelerometers. For example some form of optical detection could be used in which fringes produced from crossed optical gratings on the wand, for example, are detected by an optical detector on the set top box or elsewhere. Magnetic detection of the wand orientation is also possible as is any means of orientation detection.

The wand may also be provided with a button which, when depressed or released, causes the wand to stop generating control signals. This may be useful to enable the user to move his hand holding the wand without causing undesired changes in the displayed information.

A four-button key pad may also be used instead of joystick controller 36. In this case, each of the respective up, down, right and left signals would be generated by a respective key on the key pad. Preferably, the control would be arranged such that the speed of scrolling would be monotonically related to the length of time that the "up" or "down" key is depressed. This key pad arrangement may also be implemented as a two key rocker switch.

In the user input devices described so far, the user may generate control signals by only one type of action (by moving the joystick, mouse etc). However, by providing a mechanism by which the user can generate a second type of control signal by a second type of action, for example by providing a switch to enable the user to generate a control signal by pressing or releasing the switch, further functionality can be provided. Taking the joystick controller as an example, control may be arranged so that, if the user moves the joystick to the right and depresses the switch, then a level of information two (or more) levels below that of the current information in the tree is displayed. Similarly, control may be arranged so that if the user moves the joystick to the left and presses the button, then the top most level of information in the tree is displayed. Other functionality is, of course, possible.

Although in the embodiment illustrated with reference to the drawings the subscriber stations have been described as utilising a conventional television, it is within the scope of the invention that any form of output device may be used. For example, the invention includes a system in which one or more subscriber stations comprises a personal computer or other computer coupled via the internet or other means to one or more server stations. In this case, control of scrolling may be by any of the means described including the joystick controller, a wand controller for example as described with reference to FIGS. 11 to 13, or the cursor control keys on the keyboard may be used for controlling scrolling and display changes with the up and down keys being used for scrolling and the left and right keys being used for level changes, for example.

It is mentioned above that information for display to the user may comprise a photograph or a video or audio clip. For example, a photograph may represent a high level of information, the selection of which causes a video clip to be displayed as a lower level of information. The scroll function when a video or audio clip is playing may be used to "fast forward" or "fast rewind" the video or audio clip. In an alternative arrangement, a photograph may be displayed at a low resolution and/or a small size in a high-level display, and at a higher resolution and/or larger size in a low-level display.

Although the invention has been described with reference to visual and audio visual output it is also applicable to systems which output audio only. Thus, for example, an audio distribution system as for example on an aircraft, may have the available data organised into categories, titles and extracts as described with reference to FIG. 4 allowing a user to rapidly scan through the available audio programmes, listen to extracts from them and select a required programme to be heard in full.

Although four information types have been described in explaining the preferred embodiment, the invention is applicable to systems providing only a single type of information, only a few types of information or a wide variety of different types of information. The information may be provided from a remote server or may be organised in accordance with the invention in a local information storage device, for example, a CD ROM or video disc etc.

The file structures may be varied compared to those of the preferred embodiment shown in FIG. 4. For example, the information in File 1 of FIG. 4 could be modified within the scope of the invention, in appropriate circumstances, so that it is not divided into categories but merely contains names or titles of items of information together with extracts or summaries or still or moving video clips or the like indicative of the content of the corresponding items. Alternatively, the titles may be omitted in appropriate circumstances from File 1 of FIG. 4 so that File 1 would contain just extracts such as video clips, summaries, quotations or the like from or indicative of the items of information which may be output. As a further modification of the file structure, where an item is relatively short, the whole of the item may be contained in File 2A, 2B, 2C etc., so that the file structure would consist only of File 1 and Files 2A to 2D etc., i.e. Files 3A etc., would be omitted.

As a yet further modification, pointers to other file structures, where an arrangement similar to that shown in FIG. 8 is provided, may be included in File 1 of FIG. 4 so that a user may skip the mid and low level displays derivable from a given file structure and go directly from the high level display of the current file structure to the high level display of a succeeding file structure.

Although in the examples described above different levels of information are displayed within one document (for example a newspaper) instead, different levels of information may be displayed from multiple documents. For example, a first level of display may comprise headlines and first sentences within a first newspaper. Selection of a desired headline (by moving joystick 38 to the right when the headline has been highlighted by scrolling to the appropriate position) causes a second level display showing the headlines and first sentences of articles on the same topic from a number of different newspapers, including the first newspaper. Selection of a headline from this level of display then causes the first page of the selected article to be displayed, or may cause a further level of display showing the headlines and first sentences in the newspaper from which the article selected came.

Further, the information may be arranged in the tree structure such that the high-level display in FIG. 5a and the mid-level display in FIG. 5b contain lists of files, while the low-level display of FIG. 5c contains the actual content of a document within one of those files. That is, selection of a document (for example from the mid-level display) causes the document to "open" and be displayed.

As noted previously, the embodiments described above are applicable for use with any linked information, that is, information arranged in units with links defined between the units (for example to define sibling and parent units). The embodiments may be used in systems in which each unit of information has a plurality of sibling units, but only one parent unit or in systems in which information units have a plurality of parent units as well as sibling units. The level of detail of information within a sibling unit may be greater than or less than the level of detail in its parent unit.

When information from a sibling unit is being displayed, movement of the joystick, or other user input device, to the left may cause either information from the unit of information which was displayed immediately previously to the sibling unit (that is, the unit from which the sibling unit was selected) or information from a parent unit, different to the unit displayed immediately previously, to be output by the output means. Control in this manner is useful where, for example, a sibling unit in a first document, and having a parent unit in that first document, is accessed (selected) from an information unit within a second document. In this case, the system may be set so that the consequence of a left movement of the user input device is predefined for all such movements, or alternatively, the user may be presented with a choice where there is the option of displaying the unit displayed immediately previously, or the parent unit within the document in which the sibling is located.

What is claimed is:

1. Information retrieval and output apparatus for retrieving and outputting information from storage means, comprising:

information retrieval means for retrieving information from the storage means;

output means for outputting to a user information retrieved from the storage means; and selecting means for selecting information for output in units by the output means in accordance with links between the units of information, said selecting means comprising a user input means for generating first, second, third and fourth respective control signals in response to first, second, third and fourth respective operator single actions and control means for controlling the information output by the output means in response to the control signals, wherein said user input means comprises a control member having first and second degrees of freedom and movable or actuable in first and second directions in each of said degrees of freedom, said first and second control signals being produced in response to movement or actuation in first and second directions respectively in said first degree of freedom with an extent of movement or actuation defining a value of the control signal for determining the speed of scrolling, and said third and fourth control signals being produced in response to movement or actuation in first and second directions respectively in the second degree of freedom, wherein said first and second degrees of freedom are movements or actuations along first and second orthogonal lines;

and wherein:

the control means is arranged so that:

in response to the first control signal, information from a current unit being output by the output means is scrolled through in a first direction at a speed related to the value of the control signal set by the first operator action;

in response to the second control signal, information from the current unit being output by the output means is scrolled through in a second direction, opposite to the first direction, at a speed related to the value of the control signal set by the second operator action;

in response to the third control signal, information from a first further unit defined by a first link from the current unit is output by the output means; and in response to the fourth control signal, information from a second further unit defined by a second link from the current unit is output by the output means.

2. Apparatus according to claim 1, wherein said control member is a joystick.

3. Apparatus according to claim 1, wherein said control member is a pressure-sensitive member.

4. Information retrieval and output apparatus for retrieving and outputting information from storage means, comprising:

information retrieval means for retrieving information from the storage means;

output means for outputting to a user information retrieved from the storage means; and selecting means for selecting information for output in units by the output means in accordance with links between the units of information, said selecting means comprising a user input means for generating first, second, third and fourth respective control signals in response to first, second, third and fourth respective operator single actions and control means for controlling the information output by the output means in response to the control signals, wherein said user input means is a trackerball, said first and second control signals being produced in response to movement of the trackerball in first and second opposite directions respectively with an extent of movement defining a value of the control signal for determining the speed of scrolling, and said third and fourth control signals being produced in response to movement of the trackerball in third and fourth opposite directions respectively, and wherein the control means is arranged so that:

wherein:

the control means is arranged so that:

in response to the first control signal, information from a current unit being output by the output means is scrolled through in a first direction at a speed related to the value of the control signal set by the first operator action;

in response to the second control signal, information from the current unit being output by the output means is scrolled through in a second direction, opposite to the first direction, at a speed related to the value of the control signal set by the second operator action; information from a first further unit defined by a first link from the current unit is output by the output means in response to a third said control signal generated by a relatively fast movement of the trackerball in the third direction, but is not output in response to a relatively slow movement of the trackerball in the third direction; and information from a second further unit defined by a second link from the current unit is output by the output means in response to a fourth said control signal generated by a relatively fast movement of the trackerball in the fourth direction, but is not output in response to a relatively slow movement of the trackerball in the fourth direction.

5. Apparatus according to claim 4, wherein the control means is arranged to automatically re-set a zero-displacement reference position for the third and fourth directions after a relatively fast movement of the trackerball in the third direction or the fourth direction.

6. Information retrieval and output apparatus for retrieving and outputting information from storage means, comprising:

information retrieval means for retrieving information from the storage means;

output means for outputting to a user information retrieved from the storage means; and selecting means for selecting information for output in units by the output means in accordance with links between the units of information, said selecting means comprising a user input means for generating first, second, third and fourth respective control signals in response to first, second, third and fourth respective operator single actions and control means for controlling the information output by the output means in response to the control signals, wherein said user input means is a mouse, said first and second control signals being produced in response to movement of the mouse in first and second opposite directions respectively, with an extent of movement defining a value of the control signal for determining the speed of scrolling, and said third and fourth control signals being produced in response to movement of the mouse in third and fourth opposite directions respectively, and wherein:

the control means is arranged so that:

in response to the first control signal, information from a current unit being output by the output means is scrolled through in a first direction at a speed related to the value of the control signal set by the first operator action;

in response to the second control signal, information from the current unit being output by the output means is scrolled through in a second direction, opposite to the first direction, at a speed related to the value of the control signal set by the second operator action;

in response to the third control signal, information from a first further unit defined by a first link from the current unit is output by the output means;

in response to the fourth control signal, information from a second further unit defined by a second link from the current unit is output by the output means; but the information being output is not changed in response to movement of the mouse less than a predefined distance in any of the first, second, third and fourth directions.

7. Apparatus according to claim 6, further comprising means to display on display means a graphic indicating to the user a current position of the mouse in the first, second, third and fourth directions and the predefined distance in each direction.

8. Information retrieval and output apparatus for retrieving and outputting information from storage means, comprising:

information retrieval means for retrieving information from the storage means;

output means for outputting to a user information retrieved from the storage means; and selecting means for selecting information for output in units by the output means in accordance with links between the units of information, said selecting means comprising a user input means for generating first, second, third and fourth respective control signals in response to first, second, third and fourth respective operator single actions and control means for controlling the information output by the output means in response to the control signals, wherein said user input means is a wand, said first and second control signals being produced in response to angular displacement of the wand in first and second opposite directions respectively with an extent of angular displacement defining a value of the control signal for determining the speed of scrolling, and said third and fourth control signals being produced in response to angular displacement of the wand in third and fourth opposite directions respectively;

and wherein:

the control means is arranged so that:

in response to the first control signal, information from a current unit being output by the output means is scrolled through in a first direction at a speed related to the value of the control signal set by the first operator action;

in response to the second control signal, information from the current unit being output by the output means is scrolled through in a second direction, opposite to the first direction, at a speed related to the value of the control signal set by the second operator action;

in response to the third control signal, information from a first further unit defined by a first link from the current unit is output by the output means; and in response to the fourth control signal, information from a second further unit defined by a second link from the current unit is output by the output means.

9. Apparatus according to claim 9, further comprising means for enabling a user to set a zero-displacement position for the first and second directions and for the third and fourth directions.

10. Information retrieval and output apparatus for retrieving and outputting information from storage means, comprising:

information retrieval means for retrieving information from the storage means;

output means for outputting to a user information retrieved from the storage means; and selecting means for selecting information for output in units by the output means in accordance with links between the units of information, said selecting means comprising a user input means for generating first, second, third and fourth respective control signals in response to first, second, third and fourth respective operator single actions and control means for controlling the information output by the output means in response to the control signals, wherein said user input means comprises four control elements, each actuable manually for different durations to cause the user input means to produce a respective different one of the control signals, the respective duration of actuation of each element for producing the first and second control signals generating a value of the respective first and second control signals for determining the speed of scrolling;

wherein:

the control means is arranged so that:

in response to the first control signal, information from a current unit being output by the output means is scrolled through in a first direction at a speed related to the value of the first control signal set by the first operator action;

in response to the second control signal, information from the current unit being output by the output means is scrolled through in a second direction, opposite to the first direction, at a speed related to the value of the second control signal set by the second operator action;

in response to the third control signal, information from a first further unit defined by a first link from the current unit is output by the output means; and in response to the fourth control signal, information from a second further unit defined by a second link from the current unit is output by the output means.

11. Apparatus according to claim 10, wherein the four control elements comprise first and second rocker switches.

12. Information retrieval and output apparatus for retrieving and outputting information from storage means, comprising:

information retrieval means for retrieving information from the storage means;

output means for outputting to a user information retrieved from the storage means; and selecting means for selecting information for output in units by the output means in accordance with links between the units of information, said selecting means comprising a user input means for generating first, second, third and fourth respective control signals in response to first, second, third and fourth respective operator single actions and control means for controlling the information output by the output means in response to the control signals, wherein said first operator action is an opposite action to said second operator action, and said third operator action is an opposite action to said fourth operator action;

and wherein:

the control means is arranged so that:

in response to the first control signal, information from a current unit being output by the output means is scrolled through in a first direction at a speed related to a value set by the first operator action;

in response to the second control signal, information from the current unit being output by the output means is scrolled through in a second direction, opposite to the first direction, at a speed related to a value set by the second operator action;

in response to the third control signal, information from a first further unit defined by a first link from the current unit is output by the output means; and in response to the fourth control signal, information from a second further unit defined by a second link from the current unit is output by the output means.

13. Information retrieval and output apparatus for retrieving and outputting moving image data from storage means, comprising:

information retrieval means for retrieving moving image data from the storage means;

a display for displaying to a user moving images retrieved from the storage means, and selecting means for selecting information comprising moving image data for display in units on the display in accordance with links between the units of information, said selecting means comprising a user input means for generating first, second, third and fourth respective control signals in response to first, second, third and fourth respective operator single actions and control means for controlling the information displayed on the display in response to the control signals, wherein the control means is arranged so that:

in response to the first control signal, the image sequence currently displayed on the display is forwarded at a speed related to a value set by the first operator action;

in response to the second control signal, the sequence currently displayed on the display is rewound at a speed related to a value set by the second operator action; and in response to the third control signal, a sequence of moving images from a first further unit defined by a first link from the current unit is displayed; and in response to the fourth control signal, a sequence of moving images from a second further unit defined by a second link from the current unit is displayed.

14. Information retrieval and output apparatus for retrieving and outputting information from storage means, comprising:

information retrieval means for retrieving information from the storage means;

memory for storing information retrieved from the storage means;

a display for displaying to a user information retrieved from the storage means; and selecting means for selecting information in units for display on the display in accordance with links between the units of information, said selecting means comprising a user input means for generating first, second, third and fourth respective control signals in response to first, second, third and fourth respective operator single actions and control means for controlling the information displayed in response to the control signals, wherein the units of information are defined as parent and child units, and wherein said selecting means is operative when information from at least one parent unit of information is being displayed on the display to cause downloading from the storage means to the memory of information from the child units of the parent unit so that the information from a child unit is available for display substantially immediately in response to a said third control signal;

and wherein the control means is arranged so that:

in response to the first control signal, information from a current unit being displayed is scrolled through in a first direction at a speed related to a value set by the first operator action;

in response to the second control signal, information from the current unit being displayed is scrolled through in a second direction, opposite to the first direction, at a speed related to a value set by the second operator action;

in response to the third control signal, information from a first further unit defined by a first link from the current unit is displayed substantially immediately by reading the information stored in the memory; and in response to the fourth control signal, information from a second further unit defined by a second link from the current unit is displayed.

15. Information retrieval and output apparatus for retrieving and outputting information from storage means, comprising:

information retrieval means for retrieving information from the storage means;

output means for outputting to a user information retrieved from the storage means;

selecting means for selecting information for output in units by the output means in accordance with links between the units of information, said selecting means comprising a user input means for generating first, second, third and fourth respective control signals in response to first, second, third and fourth respective operator single actions and control means for controlling the information output by the output means in response to the control signals; and means for compiling information on the types of information of interest to the user based on information output to the user via the output means;

wherein:

the control means is arranged so that:

in response to the first control signal, information from a current unit being output by the output means is scrolled through in a first direction at a speed related to a value set by the first operator action;

in response to the second control signal, information from the current unit being output by the output means is scrolled through in a second direction, opposite to the first direction, at a speed related to a value set by the second operator action;

in response to the third control signal, information from a first further unit defined by a first link from the current unit is output by the output means; and in response to the fourth control signal, information from a second further unit defined by a second link from the current unit is output by the output means.

16. Information retrieval and output apparatus for retrieving and outputting audio data from storage means, comprising:

information retrieval means for retrieving audio data from the storage means;

output means for outputting to a user audio data retrieved from the storage means; and selecting means for selecting audio data for output in units by the output means in accordance with links between the units of audio data, said selecting means comprising a user input means for generating first, second, third and fourth respective control signals in response to first, second, third and fourth respective operator single actions and control means for controlling the audio data output by the output means in response to the control signals, wherein the control means is arranged so that:

in response to the first control signal the audio sequence currently being output is forwarded at a speed related to a value set by the first operator action;

in response to the second control signal the audio sequence currently being output is rewound at a speed related to a value set by the second operator action;

in response to the third control signal, audio data from a first further unit defined by a first link from the current unit is output by the output means; and in response to the fourth control signal, audio data from a second further unit defined by a second link from the current unit is output by the output means.

17. Information retrieval and display apparatus, comprising:

data storage means comprising a plurality of data storage blocks each containing a respective different type of information, each type of information including information in a plurality of different categories within said type and each category comprising a plurality of different items of information within said category;

selecting and display means for selecting information from said data storage means and displaying said information in at least three levels of detail, a first of which is a relatively high level in which at least the categories of information within a selected information type are displayed, a second of which is an intermediate level in which an indication of contents of the different items within a selected category are displayed, and a third of which is a relatively low level in which a selected item is displayed; and control means operable to produce first, second, third and fourth command signals in response to respective first, second, third and fourth operator single actions for controlling said information selecting and display means;

said first and second signals causing scrolling in respective opposite directions through currently displayed information at a speed related to a value set by the operator action;

said third signal causing selection and display of information in a higher level of detail; and said fourth signal causing display of information in a lower level of detail.

18. Information retrieval and display apparatus comprising:

data storage means comprising a plurality of data storage blocks each containing a respective different type of information, each block comprising a first file containing a plurality of items, of relatively high level information each identifying a respective different category within the information type contained in the data storage block, a plurality of second files each associated with a respective different one of said categories and containing a plurality of items of medium level information each indicating a nature of a respective different one of a plurality of items of relatively low level information within the respective category, and a plurality of third files each associated with a respective different one of said items of medium level information and containing said relatively low level information corresponding to the respective medium level information;

selecting and display means for selecting and displaying information from said files of said data storage means; and control means operable to produce first, second, third and fourth command signals in response to respective first, second, third and fourth operator single actions;

said first and second signals being arranged to cause scrolling of displayed information in respective first and second directions through a currently selected one of said second files at a speed related to a value set by the operator action for selection of said items of medium level information;

said third signal being arranged to cause said selecting and display means to switch to displaying information from a first file with which said currently selected second file is associated; and said fourth signal being arranged to cause said selecting and display means to switch to displaying information from a third file with which the currently selected item of medium level information is associated.

19. Apparatus according to claim 18, wherein said storage means includes a plurality of further files associated with at least one of said third files and containing higher level information than the information in said at least one third file and said at least one third file contains information items indicating contents of said plurality of further files, selection of said further files being permitted by causing said control means to generate a said fourth signal when information from said at least one third file is displayed.

20. Information retrieval and output apparatus for retrieving and outputting information from storage means, comprising:

information retrieval means for retrieving information from the storage means;

output means for outputting to a user information retrieved from the storage means; and selecting means for selecting information for output in units by the output means in accordance with links between the units of information, said selecting means comprising user input means for generating first, second, third and fourth respective control signals in response to first, second, third and fourth respective operator single actions and control means for controlling the information output by the output means in response to the control signals;

wherein:

the control means is arranged so that:

in response to the first control signal, information from a current unit being output by the output means is scrolled through in a first direction at a speed related to a value set by the first operator action;

in response to the second control signal, information from the current unit being output by the output means is scrolled through in a second direction, opposite to the first direction, at a speed related to a value set by the second operator action;

in response to the third control signal, information from a first further unit defined by a first link from the current unit is output by the output means; and in response to the fourth control signal, information from a second further unit defined by a second link from the current unit is output by the output means.

21. Apparatus according to claim 20, wherein the units of information are defined as parents and children.

22. Apparatus according to claim 21, wherein the first further unit is a child unit of the current unit.

23. Apparatus according to claim 22, wherein the second further unit is a parent unit of the current unit.

24. Apparatus according to claim 23, wherein the second further unit is a unit which was displayed immediately previously to the current unit.

25. Apparatus according to claim 20, wherein the units of information are defined as parents, children and siblings.

26. Apparatus according to claim 25, wherein the second further unit is a sibling unit of the current unit.

27. Apparatus according to claim 26, wherein the first further unit is a sibling unit of the current unit.

28. Apparatus according to claim 20, wherein the information comprises information within a document.

29. Apparatus according to claim 20, wherein one unit of information comprises file information, and information in the first further unit thereof comprises information within a document in a file.

30. Apparatus according to claim 23, wherein the output means comprises display means for displaying information retrieved from the storage means.

31. Information retrieval and output apparatus for retrieving and outputting information from storage means, comprising:

information retrieval means for retrieving information from said storage means;

output means for outputting to a user information retrieved from the storage means; and selecting means for selecting information for output in units by the output means in accordance with links between the units of information, said selecting means comprising user input means for generating first, second, third and fourth respective control signals in response to first, second, third and fourth respective operator actions and control means for controlling the information output by the output means in response to the control signals, wherein:

the user input means comprises a selecting device having first and second degrees of freedom and being operable to produce first and second control signals in response to an operator action consisting of user movement or actuation of the selecting device in the first degree of freedom, and being operable to produce third and fourth control signals in response to an operator action consisting of user movement or actuation of the selecting device in the second degree of freedom; and the control means is arranged so that:

in response to the first control signal, information from a current unit being output by the output means is scrolled through in a first direction at a speed related to a value set by the movement or actuation of the selecting device; in response to the second control signal, information from the current unit being output by the output means is scrolled through in a second direction, opposite to the first direction, at a speed related to a value set by the movement or actuation of the selecting device;

in response to the third control signal, information from a first further unit defined by a first link from the current unit is output by the output means; and in response to the fourth control signal, information from a second further unit defined by a second link from the current unit is output by the output means.

32. In a system comprising storage means storing information for output to a user, output means for outputting information retrieved from the storage means, and selecting means for selecting information for output in units by the output means in accordance with links between the units of information, said selecting means comprising user input means for generating control signals and control means for controlling the information output by the output means in response to the control signals, a method of outputting information, comprising:

generating a first control signal in response to a first operator single action, and in response thereto scrolling through information from a current unit being output by the output means in a first direction at a speed related to a value set by the first operator action;

generating a second control signal in response to a second operator single action, and in response thereto scrolling through information from the current unit being output by the output means in a second direction, opposite to the first direction, at a speed related to a value set by the second operator action;

generating a third control signal in response to a third operator single action, and in response thereto outputting via the output means information from a first further unit defined by a first link from the current unit; and generating a fourth control signal in response to a fourth operator single action, and in response thereto outputting via the output means information from a second further unit defined by a second link from the current unit.

33. Control means for use in an information retrieval and output system, which system comprises storage means storing information for output to a user, output means for outputting information retrieved from the storage means, and user input means for generating first, second, third and fourth respective control signals in response to first, second, third and fourth respective operator single actions, said control means comprising means for receiving the control signals and means for generating signals to control the system so as to select information for output in units by the output means in accordance with links between the units of information, such that:

in response to the first control signal, information from a current unit being output by the output means is scrolled through in a first direction at a speed related to a value set by the first operator action;

in response to the second control signal, information from the current unit being output by the output means is scrolled through in a second direction, opposite to the first direction, at a speed related to a value set by the second operator action;

in response to the third control signal, information from a first further unit defined by a first link from the current unit is output by the output means; and in response to the fourth control signal, information from a second further unit defined by a second link from the current unit is output by the output means.

34. In a system comprising storage means storing information for output to a user, output means for outputting information retrieved from the storage means, and selecting means for selecting information for output in units by the output means in accordance with links between the units of information, said selecting means comprising user input means for generating first, second, third and fourth respective control signals in response to first, second, third and fourth respective operator single actions and control means for controlling the information output by the output means in response to the control signals, a method of operating the control means, such that:

in response to the first control signal, information from a current unit being output by the output means is scrolled through in a first direction at a speed related to a value set by the first operator action;

in response to the second control signal, information from the current unit being output by the output means is scrolled through in a second direction, opposite to the first direction, at a speed related to a value set by the second operator action;

in response to the third control signal, information from a first further unit defined by a first link from the current unit is output by the output means; and in response to the fourth control signal, information from a second further unit defined by a second link from the current unit is output by the output means.

35. A signal carrying instructions for causing a programmable processing apparatus to become configured as a controller for use in an information retrieval and output system comprising storage means storing information for output to a user, output means for outputting information retrieved from the storage means, and user input means for generating first, second, third and fourth respective control signals in response to first, second, third and fourth respective operator single actions, the instructions being arranged to configure the programmable processing apparatus to control the information output by the output means in response to the control signals so as to select information for output in units by the output means in accordance with links between the units of information, such that:

in response to the first control signal, information from a current unit being output by the output means is scrolled through in a first direction at a speed related to a value set by the first operator action;

in response to the second control signal, information from the current unit being output by the output means is scrolled through in a second direction, opposite to the first direction, at a speed related to a value set by the second operator action;

in response to the third control signal, information from a first further unit defined by a first link from the current unit is output by the output means; and in response to the fourth control signal, information from a second further unit defined by a second link from the current unit is output by the output means.

36. A data storage medium storing instructions for causing a programmable processing apparatus to become configured as a controller for use in an information retrieval and output system comprising storage means storing information for output to a user, output means for outputting information retrieved from the storage means, and user input means for generating first, second, third and fourth respective control signals in response to first, second, third and fourth respective operator single actions, the instructions being arranged to configure the programmable processing apparatus to control the information output by the output means in response to the control signals so as to select information for output in units by the output means in accordance with links between the units of information, such that:

in response to the first control signal, information from a current unit being output by the output means is scrolled through in a first direction at a speed related to a value set by the first operator action;

in response to the second control signal, information from the current unit being output by the output means is scrolled through in a second direction, opposite to the first direction, at a speed related to a value set by the second operator action;

in response to the third control signal, information from a first further unit defined by a first link from the current unit is output by the output means; and in response to the fourth control signal, information from a second further unit defined by a second link from the current unit is output by the output means.

37. Data processing apparatus for retrieving and outputting information in a plurality of different categories, each category comprising a plurality of different items, comprising:

means for generating a first output identifying said categories for enabling selection of a category in response to a first user command;

first retrieving means responsive to selection of a category by a said first user command:
(a) for generating a second output identifying the different items in the selected category for enabling selection of an item in response to a second user command, and
(b) for retrieving for potential future output the first portion of respective items in the selected category;

second retrieving means responsive to selection of an item by a said second user command:
(a) for generating a third output containing the first portion of the selected item retrieved by the first retrieving means, and
(b) for retrieving for future output the remainder of said selected item.

38. Apparatus in accordance with claim 37, wherein said first retrieving means is responsive to a third user command:
(a) for generating said first output in place of said second output, and
(b) for enabling selection of a category of said categories identified in said first output in response to a said first user command.

39. Apparatus in accordance with claim 37, wherein said second retrieving means is responsive to a fourth user command:
(a) for generating said second output in place of said third output, (b) for enabling selection of an item of said items identified in said selected category in said second output in response to a said second user command, and (c) for retrieving for potential future output the first portion of respective items in the selected category.

40. Apparatus according to claim 37, further comprising a memory for storing items of information in categories for retrieval by said apparatus.

41. Apparatus according to claim 37, further comprising a memory at a remote location from said apparatus for storing items of information in categories for retrieval by said apparatus, and a communication link between said apparatus and said memory.

42. Apparatus for retrieving information arranged in a hierarchy of levels from a data store in accordance with instructions from a user, the apparatus comprising a memory for storing retrieved information, an output for outputting retrieved information, and an information retriever for retrieving and storing in said memory at least part of the information from the next lower level of the hierarchy available for selection by a user while information of a current level of detail is being output so that, in response to a selection by the user of information from said next lower level, the information can be read from the memory for rapidly output to the user.

43. A method of retrieving and outputting information in a plurality of different categories, each category comprising a plurality of different items, comprising:

generating a first output identifying said categories for enabling selection of a category in response to a first user command;

in response to selection of a category by a said first user command:
  (a) generating a second output identifying the different items in the selected category for enabling selection of an item in response to a second user command, and
  (b) retrieving for potential future output the first portion of respective items in the selected category;

in response to selection of an item by a said second user command:
  (a) generating a third output containing the first portion of the selected item retrieved by the first retrieving means, and
  (b) retrieving for future output the remainder of said selected item.

44. A signal carrying instructions for causing a programmable processing apparatus to become operable to perform a method as set out in claim 43.

45. A storage device storing instructions for causing a programmable processing apparatus to become operable to perform a method as set out in claim 43.

* * * * *

UNITED STATES PATENT AND TRADEMARK OFFICE
CERTIFICATE OF CORRECTION

PATENT NO. : 6,314,426 B1  
DATED : November 6, 2001  
INVENTOR(S) : S.C. Martin et al.

Page 1 of 2

It is certified that error appears in the above-identified patent and that said Letters Patent is hereby corrected as shown below:

Title page,
Item [75] Inventors "Over," should read -- Cambridgeshire, --
Item [56] References Cited, U.S. PATENT DOCUMENTS, "Inoune et al. should read -- Inoue et al. --
Item [56] References Cited, U.S. PATENT DOCUMENTS, insert in appropriate order the following:

| | | |
|---|---|---|
| --4,768,144 | 8/1988 | Winter et al. |
| 4,805,119 | 2/1989 | Maeda et al. |
| 5,065,347 | 11/1991. | Pajak et al. -- |

Item [56] References Cited, FOREIGN PATENT DOCUMENTS, insert in appropriate order the following:

| | | | |
|---|---|---|---|
| --0287858 | A2 | 10/1988 | (EP) |
| 0539599 | A1 | 5/1993 | (EP) |
| 9300067 | | 8/1994 | (NL) -- |

Item [56]References Cited, OTHER PUBLICATIONS, insert in appropriate order the following:
-- Microsoft Press Release, Microsoft Announces Microsoft IntilliMouse, http:///www.microsoft.com/corpinfo/press/1996/jul96/intmspr.htm, Sep. 18, 1996.

Microsoft Windows, Version 3.11, File Manager System, © 1985-1993, Microsoft Corporation. --

Microsoft Windows 95, Explorer,© 1981-1995 Microsoft Corporation.

WordPerfect for Windows, Version 6.0a, Nested Menu System, WordPerfect Corporation 1992-1994. --

Column 19,
Line 26, the clause beginning "wherein said user input" should begin a new paragraph
Line 67, "the storage means:" should read -- the storage means; --

Column 20,
Lines 22-23, delete "wherein: the control means is arranged so that:"

Column 22,
Line 17, "claim 9, should read -- claim 8, --

UNITED STATES PATENT AND TRADEMARK OFFICE
CERTIFICATE OF CORRECTION

PATENT NO.   : 6,314,426 B1
DATED        : November 6, 2001
INVENTOR(S)  : S.C. Martin et al.

It is certified that error appears in the above-identified patent and that said Letters Patent is hereby corrected as shown below:

Column 23,
Line 42, the phrase beginning "selecting means for select-" should begin a new paragraph
Line 58, "action; and" should read -- action; --

Column 26,
Line 13, "item, of" should read -- items of --

Column 27,
Line 45, "claim 23," should read -- claim 20, --
Line 62, "operator actions" should read -- single operator actions --

Column 28,
Line 13, the phrase beginning "in response to the second control" should begin a new paragraph Column 30,
Line 48, "selected catetory;" should read -- selected category; and --

Column 31,
Line 25, "rapidly" should read -- rapid --

Signed and Sealed this

Twenty-eighth Day of May, 2002

Attest:

JAMES E. ROGAN
*Attesting Officer*   *Director of the United States Patent and Trademark Office*